United States Patent [19]

Sescila, III et al.

[11] Patent Number: 5,953,511
[45] Date of Patent: Sep. 14, 1999

[54] PCI BUS TO IEEE 1394 BUS TRANSLATOR

[75] Inventors: Glen O. Sescila, III; Brian K. Odom; Kevin L. Schultz, all of Pflugerville, Tex.

[73] Assignee: National Instruments Corporation, Austin, Tex.

[21] Appl. No.: 08/835,527

[22] Filed: Apr. 8, 1997

[51] Int. Cl.$^6$ .............................. G06F 13/38; G06F 13/00; G06F 13/40

[52] U.S. Cl. .......................... 395/309; 395/281; 395/308; 395/280

[58] Field of Search ................................... 395/281, 308, 395/309, 280

[56] References Cited

U.S. PATENT DOCUMENTS

| | | | |
|---|---|---|---|
| 3,227,591 | 1/1966 | Lambert et al. | 156/89 |
| 3,290,182 | 12/1966 | Eichelman et al. | 148/11.5 |
| 3,513,520 | 5/1970 | Vandervell et al. | 29/149.5 |
| 3,620,799 | 11/1971 | Hoelscher et al. | 117/22 |
| 3,648,355 | 3/1972 | Shida et al. | 29/471.7 |
| 4,053,728 | 10/1977 | Talento et al. | 200/267 |
| 4,338,380 | 7/1982 | Erickson et al. | 428/594 |
| 4,505,418 | 3/1985 | Neidig et al. | 228/122 |
| 4,598,025 | 7/1986 | Mizuhara | 428/450 |

(List continued on next page.)

OTHER PUBLICATIONS

McDonnell Douglas Aerospace, "Tokamak Physics Experiment Plasma Facing Components (including Appendix A and Appendix B)", Sep. 29, 1995.

Texas Instruments Publication entitled "TSB12LV21A (PCI-Lynx) IEEE 1394–1995 Bus to PCI Bus Interface," Apr. 1997, pp. 1–17.

Adaptec Technical Reference, "AHA–8940 Functional Specification/PCI–to–1394 Host Adapter," 1996, pp. 2–1 to 2–31.

Publication entitled "Preliminary CXD1947Q, IEEE1394 Link Layer/PCI Bridge LSI," Oct. 1996, pp. 1–4.

1394 HCI PEN Publication entitled "1394 Open Host Controller Interface Specification/Draft 0.93," Apr. 1997, pp. i–xiv, 1–140.

Primary Examiner—Ayaz R. Sheikh
Assistant Examiner—Frantz Blanchard Jean
Attorney, Agent, or Firm—Conley, Rose & Tayon; Jeffrey C. Hood; E. Alan Davis

[57] ABSTRACT

A PCI bus to IEEE 1394 bus translator for coupling a PCI device to a host computer via an IEEE 1394 bus. The translator translates addresses of PCI bus cycles initiated by the PCI device into 1394 memory addresses and performs data transfers between the PCI device and host computer by exchanging 1394 request and response packets with the host computer using the translated 1394 memory address. The translator also translates 1394 memory addresses of 1394 request packets received from the host computer into PCI cycle addresses and performs data transfers between the PCI device and host computer by initiating PCI bus cycles targeted at the PCI device using the translated PCI bus cycle addresses. The translator posts data from sequential PCI bus write cycles initiated by the PCI device into a write-posting FIFO until granted ownership of the 1394 bus. The translator combines the PCI write cycle data into a single IEEE 1394 write request packet and transmits the packet on the 1394 bus to the host computer. The translator, if configured to a first mode, pipelines subsequent PCI bus write cycles by posting the PCI write cycle data into the write-posting FIFO once reception of the first 1394 write request packet has been acknowledged by the host computer but prior to the host computer responding with status indicating the completion of the write transaction, in particular whether or not a resource conflict occurred. In response to a PCI read cycle initiated by the PCI device, the translator pre-fetches a larger amount of data than specified in the PCI read cycle from the host computer into a pre-fetch FIFO in order to satisfy subsequent PCI read cycles which are in address sequence with the previous PCI read cycle. The translator pre-fetches more data from the host computer once the pre-fetch FIFO becomes a predetermined amount empty in order to pipeline the consumption of the pre-fetch data by the PCI device and the transmission of the pre-fetch data by the host computer to the translator.

56 Claims, 18 Drawing Sheets

U.S. PATENT DOCUMENTS

| | | | |
|---|---|---|---|
| 4,624,403 | 11/1986 | Kohno et al. | 228/122 |
| 4,624,404 | 11/1986 | Ohmae et al. | 228/198 |
| 4,690,793 | 9/1987 | Hitachi, Ltd., et al. | 376/136 |
| 4,764,341 | 8/1988 | Flaitz et al. | 419/9 |
| 4,858,818 | 8/1989 | Knox et al. | 228/164 |
| 4,860,939 | 8/1989 | Guinet et al. | 228/122 |
| 4,907,733 | 3/1990 | Pratt et al. | 228/122 |
| 5,182,075 | 1/1993 | Gotoh et al. | 376/150 |
| 5,323,954 | 6/1994 | Shetty et al. | 228/187 |
| 5,375,224 | 12/1994 | Larson et al. | |
| 5,548,587 | 8/1996 | Bailey et al. | |
| 5,602,853 | 2/1997 | Bon-Michael et al. | |
| 5,632,016 | 5/1997 | Hoch et al. | |
| 5,642,489 | 6/1997 | Bland et al. | 395/308 |
| 5,649,129 | 7/1997 | Kowert | 395/309 |
| 5,655,151 | 8/1997 | Bowes et al. | |
| 5,721,841 | 2/1998 | Szczepanek | |
| 5,721,863 | 2/1998 | Covino et al. | |
| 5,724,272 | 3/1998 | Mitchell et al. | 364/579 |
| 5,729,556 | 3/1998 | Benbassat et al. | |
| 5,731,923 | 3/1998 | Sakuma | |
| 5,734,850 | 3/1998 | Kenny et al. | 395/309 |
| 5,764,924 | 6/1998 | Hong | 395/281 |

PCI BUS TO IEEE 1394 BUS TRANSLATOR

FIELD OF THE INVENTION

The present invention relates to memory-mapped bus translation, and more particularly to PCI bus to IEEE 1394 bus translation.

DESCRIPTION OF THE RELATED ART

The Peripheral Component Interconnect (PCI) Local Bus is a high performance, 32-bit or 64-bit bus with multiplexed address and data lines. It is intended for use as an interconnect mechanism between highly integrated peripheral controller components, peripheral add-in boards, and processor/memory systems. The PCI bus has emerged as a very popular expansion bus for many computer systems and embedded systems. A plethora of chipsets, devices, and controllers with a PCI bus interface have been marketed in the last few years. Examples of I/O functions performed by PCI products include high-speed graphics controllers, Small Computer System Interface (SCSI) controllers, Fiber Channel adapters, Serial Storage Architecture (SSA) adapters, and local area network (LAN) interface devices such as Ethernet, Token Ring and FDDI controllers.

Another popular I/O function in which PCI is used is in the area of instrumentation. An instrument is a device which collects data or information from an environment or unit under test and displays this information to a user. An instrument may also perform various data analysis and data processing on acquired data prior to displaying the data to the user. Examples of various types of instruments include data acquisition devices, oscilloscopes, digital multimeters, pressure sensors, etc. The types of information which might be collected by respective instruments include voltage, resistance, distance, velocity, pressure, frequency of oscillation, humidity or temperature, among others.

Modem instrumentation systems are moving from dedicated stand-alone hardware instruments such as oscilloscopes, digital multimeters, etc., to a concept referred to as virtual instrumentation. Virtual instrumentation systems comprise instrumentation hardware such as circuit boards which plug into general purpose personal computers. The instrumentation hardware is controlled by software which executes on the computers. Many virtual instrument hardware devices have been developed which plug into a PCI bus. Other popular instrumentation buses are the VXI (VMEbus eXtensions for Instrumentation) bus and General Purpose Interface Bus (GPIB).

In instrumentation applications, as well as others, often there is a need for the I/O function to be physically located remote from the host computer. For example, a data acquisition (DAQ) device may be required to be located in a test chamber which is separated by some distance from the host computer controlling it. One solution for remotely interfacing VXI instruments in a VXI chassis to a computer is the Multisystem eXtension Interface (MXI) bus.

The MXI bus is an open standard 32-bit general purpose system bus which interconnects up to eight MXI devices using a flexible cable. The MXI cable includes 32 multiplexed address and data lines with parity, address modifiers for multiple address spaces, single-level multi-master prioritized bus arbitration signals, a single interrupt line, a bus error line and handshake lines. MXI devices use memory-mapped read and write operations to access resources, such as registers and memory, of other MXI devices. The length of the MXI cable may be up to a maximum of 20 meters. In a typical configuration, a MXI interface card is connected to an expansion bus of the host computer, such as an ISA or PCI bus. Another MXI interface card is plugged into a VXI slot of the VXI instrument chassis, and the two interface cards are coupled together via a MXI cable.

One drawback of an MXI bus solution is the MXI bus interface cards and cables are not commodity items, and thus are relatively expensive. Thus, a solution is desired for remotely coupling PCI devices to a host computer. Since many PCI devices have already been developed, as well as associated device driver software for controlling them, it is highly desirable for the solution to require no modification to existing PCI device hardware and little or no modification to their associated device driver software.

A bus which provides remote coupling of devices in a memory-mapped manner is the IEEE 1394 bus, commonly referred to as the "Fire Wire" bus. The 1394 bus is a memory-mapped serial bus which allows each of 63 devices on a cable to be connected up to 4.5 meters apart. IEEE 1394 bus adapters are readily available which connect to a host computer expansion bus, such as a PCI bus, and provide a 1394 interface for coupling to 1394 devices. These IEEE 1394 bus adapters are becoming a commodity item, making them relatively low cost. In addition, 1394 cables and 1394 interface circuit cores are also becoming readily available commodity items. However, the 1394 bus does not provide the ability for direct connection of PCI devices. In addition to the IEEE 1394 bus, several other high speed serial bus standards are available, including IEEE 1394.2, and the Universal Serial Bus (USB), among others. These buses also do not provide for direct connection of PCI devices. Therefore, an apparatus, system and method for remotely coupling PCI devices to a high speed serial bus, such as an IEEE 1394, coupled to a host computer is desired.

The overhead of transmitting request, response and acknowledge packets in the IEEE 1394 protocol is typically much larger than the protocol overhead associated with a PCI bus transaction. Therefore, translating PCI bus read or write cycles to 1394 transactions could result in relatively poor performance, particularly in terms of data throughput between a PCI device remotely coupled via a 1394 bus to a host computer. Therefore, it is further desired that the apparatus, system and method for remotely coupling PCI devices to an IEEE 1394 bus coupled to a host computer provide acceptable performance, particularly in terms of data throughput between the PCI devices and the host computer.

As previously mentioned, PCI to IEEE 1394 bus adapters exist for coupling a host computer to a 1394 bus, i.e., for enabling a card connected to a PCI bus in the host computer to provide a 1394 interface to other 1394 devices. However, the PCI to 1394 bus adapters are programmed by the host computer processor to perform transfers on the 1394 bus. In particular, the host computer processor programs the host bus adapter with the 1394 address of the data to be transferred. Furthermore, the host bus adapter acts as the PCI master during data transfers between the adapter and the PCI bus. Furthermore, the host computer, not the PCI to 1394 bus adapter, typically provides the PCI bus arbitration circuitry required. If such a commodity PCI to 1394 bus adapter were to be used at the remote location of an I/O device, i.e., the location where for example the PCI data acquisition device resides, the PCI device would have to be modified to supply the PCI arbitration circuitry. Furthermore, the PCI device would have to be modified to program the bus adapter, as the host computer would have done, to perform transfers on the 1394 bus. However, it is desired, as previously mentioned, to have an apparatus, system and method for remotely coupling PCI devices to an IEEE 1394 bus coupled to a host computer which does not require modification of the existing PCI device hardware and little or no modification to existing device driver software for controlling the PCI devices.

SUMMARY OF THE INVENTION

The present invention provides a PCI bus to IEEE 1394 bus translator for coupling a PCI device to a host computer via an IEEE 1394 bus. The host computer includes an IEEE 1394 bus for coupling to remote I/O devices. The PCI bus to IEEE 1394 bus translator enables a PCI device to connect to the IEEE 1394 bus as a 1394 device. The translator thus advantageously enables the PCI device, such as an instrument, to be remotely coupled to the host computer rather than having to be plugged into a local PCI bus of the host computer.

The translator is operable as a target of PCI memory cycles initiated by the PCI device and to translate the PCI memory cycles into 1394 transactions with the host computer in order to perform data transfers between the host computer and the PCI device. The translator comprises a PCI slave coupled to the PCI bus. The PCI slave may be a target of a PCI memory cycle initiated by the PCI device. The translator further comprises an IEEE 1394 initiator coupled to the PCI slave which receives the PCI address of the PCI memory cycle and translates the PCI memory cycle address into an IEEE 1394 address. The translator further comprises packet dispatcher logic coupled to the IEEE 1394 initiator which receives the IEEE 1394 address and creates an IEEE 1394 request packet including the IEEE 1394 address for transmission on the IEEE 1394 bus to the host computer. The translator further comprises packet receiver logic which receives a IEEE 1394 response packet sent by the host computer to the translator in response to the request packet.

If the PCI memory cycle is a PCI memory write cycle, the IEEE 1394 initiator receives the data and provides the data to the packet dispatcher logic. The packet dispatcher logic creates a write request packet and includes the data in a data payload portion of the write request packet and which includes the translated 1394 address. If the PCI memory cycle is a PCI memory read cycle, the 1394 initiator creates a read request packet including the translated 1394 address. The host computer responds to the read request packet by sending a read response packet, which is received by the packet receiver logic, including data associated with the IEEE 1394 address in a data payload portion of the read response packet. The PCI slave receives the data and provides the data to the PCI device in response to the PCI memory read cycle.

In one embodiment, the translator translates the PCI address into a 1394 address by assigning the lower 31 bits of the PCI address to the lower 31 bits of the 48 bit destination offset field of the 1394 request packet and assigning bits from a host configurable register to the upper 17 bits of the destination offset.

The translator is also operable to receive 1394 request packets from the host computer and to translate the 1394 request packets such that the translator initiates PCI cycles targeted at the PCI device in order to perform data transfers between the host computer and the PCI device. The packet receiver logic receives an IEEE 1394 request packet, including an IEEE 1394 address, from the host computer and an IEEE 1394 slave coupled to the packet receiver logic receives the IEEE 1394 address and translates the IEEE 1394 address into a PCI cycle address. A PCI master coupled to the IEEE 1394 slave receives the PCI cycle address and initiates a PCI cycle on the PCI bus to the PCI device. The packet dispatcher logic creates an IEEE 1394 response packet for transmission on the IEEE 1394 bus to the host computer in response to the request packet.

If the IEEE 1394 request packet is an IEEE 1394 write request packet including data in a data payload portion, the IEEE 1394 slave receives the data and provides the data to the PCI master which initiates a PCI write cycle, including the translated PCI address, in order to provide the data to the PCI device on the PCI bus. If the IEEE 1394 request packet is an IEEE 1394 read request packet, the PCI master initiates a PCI read cycle in order to receive data associated with the translated PCI read cycle address from the PCI device. The packet dispatcher logic then creates an IEEE 1394 read response packet including the data received from the PCI device in a data payload portion of the read response packet.

In one embodiment, the translator translates 1394 addresses into PCI addresses by assigning the lower 32 bits of the 48-bit destination offset field of the 1394 request packet to be the 32-bit PCI address. The remaining 16 bits of the destination offset are used to specify a transfer mode associated with the PCI cycle which the translator performs in response to the 1394 request packet. The transfer mode field comprises subfields including, among others, an addressing mode field, a field for specifying non-compelled writes, a field for requesting byte swapping to be performed, and addressing mode specific fields.

The translator thus advantageously enables the PCI device, such as an instrument, to be remotely coupled to the host computer rather than having to be plugged into a local PCI bus of the host computer. The PCI device may act as a PCI master on the remote PCI bus by which it is coupled to the translator. The translator may be employed within a system to couple existing VXI instruments and/or GPIB instruments remotely to the host computer by further employing a PCI to VXI translator and/or PCI to GPIB translator, respectively, between the VXI instrument and/or GPIB instrument, respectively.

BRIEF DESCRIPTION OF THE DRAWINGS

A better understanding of the present invention can be obtained when the following detailed description of the preferred embodiment is considered in conjunction with the following drawings, in which.

Figure 1:
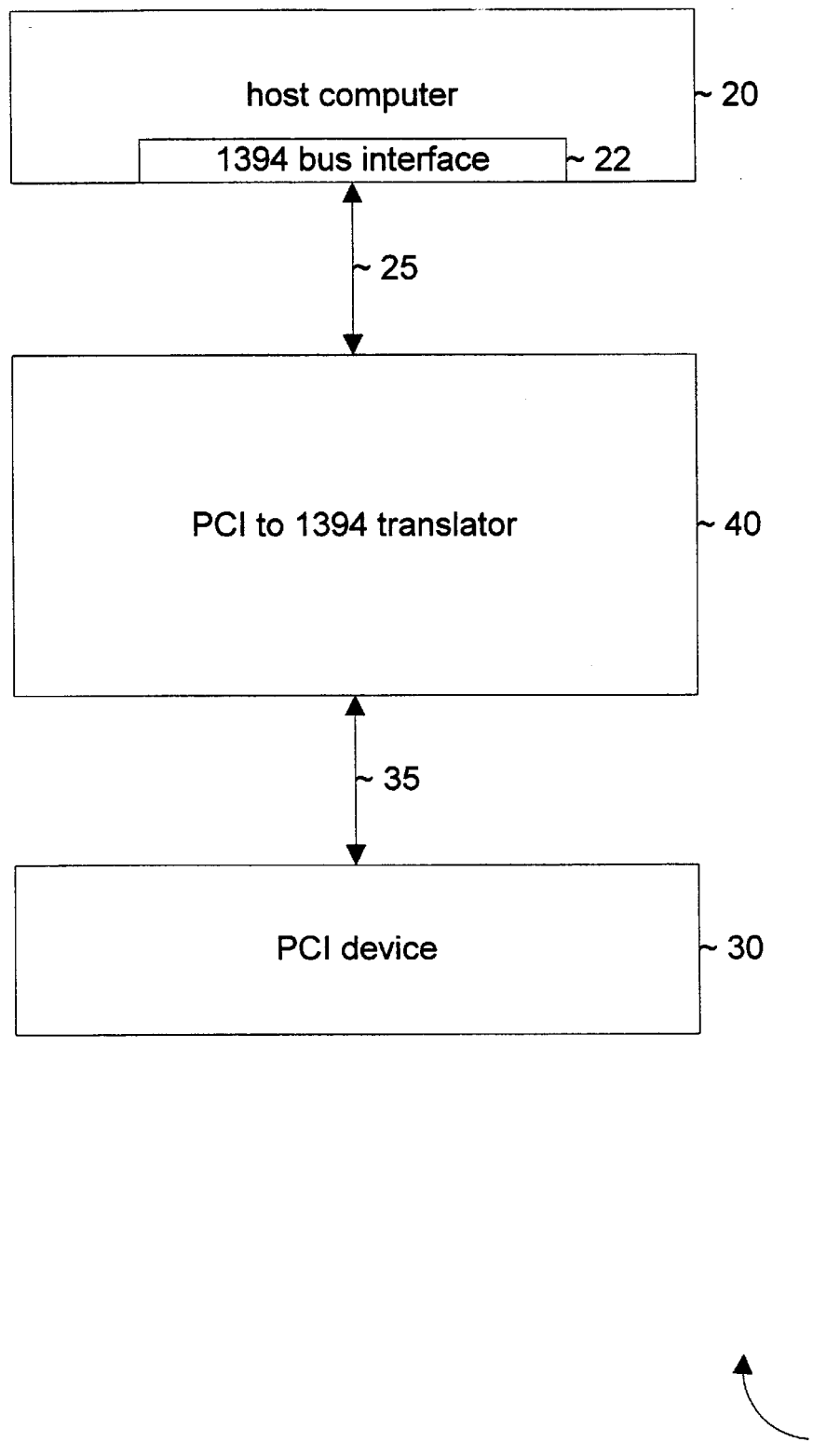
FIG. 1 is a block diagram of a computer system employing a PCI bus to IEEE 1394 bus translator according to the preferred embodiment of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

FIG. 1—Computer System

Referring now to FIG. 1, a computer system 10 employing a Peripheral Component Interconnect (PCI) bus to IEEE 1394 bus translator 40 according to the preferred embodiment of the present invention is shown. The system 10 comprises a host computer 20 including a 1394 bus interface 22 which couples to an IEEE 1394 bus 25. The translator 40 couples to the IEEE 1394 bus 25, and a PCI device 30 couples to the translator 40 by a PCI bus or PCI interface 35. In the present disclosure, the term "IEEE 1394 bus" includes both the IEEE 1394 bus and the IEEE 1394.2 bus.

The PCI bus or interface 35 preferably conforms to the Peripheral Component Interconnect Revision 2.1 Specification, which is hereby incorporated by reference in its entirety as though fully set forth herein. PCI specification states, "the PCI Local Bus is a high performance, 32-bit or 64-bit bus with multiplexed address and data lines. It is intended for use as an interconnect mechanism between highly integrated peripheral controller components, peripheral add-in boards, and processor/memory systems." PCI bus operations are well known to those of ordinary skill in the art. However, basic PCI read and write cycles, or transactions, will be described here briefly for clarity. It is noted that the present invention may be used with future revisions of the PCI bus standard and/or other expansion bus standards, as desired.

PCI bus read and write transactions occur between an initiator device, also referred to as a master, and a target device, also referred to as a slave. PCI bus read and write transactions include an address phase and one or more data phases. During the address phase, a valid address is supplied on the PCI bus address/data signals by the initiator of the transaction. The address specifies the source address of read transaction data or the destination address of write transaction data. During a data phase, the data to be read or written is transferred on the PCI bus address/data signals.

The initiator indicates the presence of valid data during a write transaction, or the reception of the data on a read transaction, via the IRDY# (initiator ready) signal. The target indicates the presence of valid data during a read transaction, or the reception of the data on a write transaction, via the TRDY# (target ready) signal. A data phase may comprise data transfer and wait state cycles. If a master or target is not ready to receive or supply data on a given bus clock cycle during data phase, it may insert wait states by deasserting the IRDY# or TRDY# signal, respectively.

The PCI specification also provides a means for a target to prematurely terminate a bus transaction by performing a target initiated termination, or disconnect. One of the prescribed target initiated termination means is referred to as a "retry" since it instructs the master to retry the bus transaction again.

The IEEE 1394 bus 25, commonly referred to as the "Fire Wire" bus, and the protocol performed on it, are in conformance with the "IEEE 1394-1995 Specification Standard for a High Performance Serial Bus", which is hereby incorporated in its entirety as though fully set forth herein. The Standard describes the 1394 bus as a "high-speed, low cost serial bus suitable for use as a peripheral bus or a backup to parallel backplane busses." The 1394 bus is a memory-mapped serial bus, that is, read and write request packets which are transmitted and received by devices on the 1394 bus include a 48-bit address for accessing memory, or other storage devices such as registers, within a 1394 device. 1394 bus operations are well known to those of ordinary skill in the art. However, basic IEEE 1394 bus read and write transactions will be described here briefly for clarity.

A typical 1394 read transaction between two 1394 nodes includes the transmission from a source node to a destination node of a read request packet for data at a specified address followed by the transmission from the destination node to the source node of a read response packet including the requested data and an indication of the completion status of the read transaction. The request and response packets are each acknowledged by a single byte acknowledge packet.

The request and response packets are referred to generically as data transmission packets, or asynchronous packets. Table 1 and Table 2 describe the format of a data transmission packet.

TABLE 1

| 0 2 4 6 8 10 12 14 | 16 18 20 22 | 24 26 28 | 31 |
|---|---|---|---|
| destination_ID | transaction label | retry | tcode | pri |
| source_ID | if request packet - upper destination_offset<br>if response packet - 4 bit response code (rcode) | | |
| packet-type-specific information: if request packet - lower destination_offset<br>if response packet - reserved | | | |
| packet-type specific quadlet data: if quadlet packet -       quadlet_data<br>if data-block packet -    data_length and extended_tcode<br>if no-data payload packet - this field does not exist. | | | |
| header_CRC | | | |
| data block quadlet 1 | | | |
| data block quadlet 2 | | | |
| ⋮ | | | |
| data_CRC | | | |

Valid data transmission packets are a sequence of quadlets. A quadlet is 32 bits. As shown, a packet comprises at least a header portion of at least four quadlets. The packet may also contain an optional data block portion comprising one or more data block quadlets followed by a cyclic redundancy check (CRC) quadlet of the data in the data quadlets, as shown. A description of the packet fields is now given.

TABLE 2

| Mnemonic | Description |
|---|---|
| destination_ID | This field specifies the Node ID of the receiving node. The upper 10 bits are the destination_bus_ID and the lower 6 bits are the destination_physical_ID. |
| transaction_label | This field specifies a unique tag for each outstanding transaction from a node. The transaction_label sent in a request subaction is returned in the corresponding response subaction. |
| retry | The retry code specifies whether this packet is a retry attempt. |
| tcode | This field specifies the transaction code, which indicates the packet format and the type of transaction to perform. If a reserved or unsupported transaction code is set, the packet is ignored. The encoding of this field is as follows:<br>code    packet and transaction type<br><br>0    write request for data quadlet<br>1    write request for data block<br>2    write response<br>3    reserved<br>4    read request for data quadlet<br>5    read request for data block<br>6    read response for data quadlet<br>7    read response for data block<br>8–B    isochronous and lock transfers<br>C–F    reserved |
| pri | Priority-Preferably this field is set to 0 when transmitting request packets, and repeated for response packets. |
| source_ID | This field specifies the node ID of the sending node. The source ID value of a request subaction is used as the destination ID value for the corresponding response subaction, if required. |
| Destination_offset | This field specifies the lower 48 bits of the destination node address for a request packet. |
| Rcode | This response code field specifies the response to a request subaction as follows:<br>code    response code description<br><br>0    The node successfelly completed the command<br>1–3    reserved<br>4    A resource conflict was detected<br>5    Hardware error, data is unavailable |

TABLE 2-continued

| Mnemonic | Description |
|---|---|
| | 6    Invalid request packet header or transaction type |
| | 7    destination offset not accessible in destination node |
| | 8–F  reserved |
| quadlet_data | These quadlets contain the data for the transfer. If the data length specifies a length that is not a multiple of four, the quadlets are padded with 0. |
| data_length | This field specifies the length in bytes of the data field in the data block quadlets. |
| extended_tcode | This field is only used if the transaction code indicates a lock request or lock response. For all other packet types, it is set to 0. |
| header_CRC | Cyclic Redundancy Code (CRC) value of the header portion of the packet. |
| data_CRC | Cyclic Redundancy Code (CRC) value of the data block portion of the packet. |

In the case of a read request packet, the transaction code indicates either a read request for data quadlet or read request for data block. Preferably, if the amount of data is a quadlet, the read request for data quadlet transaction code is used. If the amount of data is not equal to a quadlet, the read request for data block transaction code is used. In the present specification, the term data payload portion is used to describe either, a) the data quadlet field of a 1394 packet in which the associated transaction code is a write request for data quadlet or read response for data quadlet; or b) the data quadlets of a data block of a 1394 packet in which the associated transaction code is a write request for data block or read response for data block. The destination offset specifies the lower 48 bits of the address within the destination node from which the data is to be read.

After receiving the request packet, the destination node then transmits to the source node an acknowledge packet indicating that the read transaction is pending, i.e., that the request packet was successfully accepted and a response packet will follow. Table 3 and Table 4 describe the format of an acknowledge packet.

TABLE 3

| 0 | 1 | 2 | 3 | 4 | 5 | 6 | 7 |
|---|---|---|---|---|---|---|---|
| ack_code | | | | ack_parity | | | |

TABLE 4

| Mnemonic | Description |
|---|---|
| ack_code | The acknowledge code specifies the immediate response to an asynchronous packet. |
| | code    meaning |
| | 0    reserved |
| | 1    ack_complete -    The node has successfully accepted the packet and no response subaction will follow. |
| | 2    ack_ending -    The node successfully accepted the packet and a response subaction will follow at a later time. |
| | 3    reserved |
| | 4    ack_busy_X -    The packet could not be accepted; it may be accepted on a retry. |
| | 5–6  ack_busy_A & B -    The packet could not be accepted; it will be accepted when the node is not busy during the next dual phase retry. |
| | 7–C  reserved |
| | D    ack_data_error -    The node could not accept the block packet because of a data CRC error, or incorrect data_length field. |
| | E    ack_type_error -    A field in the request packet header was incorrect, or an invalid transaction was attempted. |
| | F    reserved |
| ack_parity | This field specifies a parity check for the acknowledge packet. The value shall be the one's complement of the acknowledge code. If the receiving node detects an acknowledge parity error, the packet is ignored. |

The destination node then retrieves the data from the specified address and transmits to the source node a response packet including the requested data, a transaction code indicating a read response for data, and a response code indicating the completion status of the transaction. The source node then transmits to the destination node an acknowledge packet indicating that the response packet was successfully accepted. The source node then stores or uses the data as desired.

A typical 1394 write transaction between two 1394 nodes is similar in many respects to a read transaction and includes the transmission from a source node to a destination node of a write request packet including data to be written at a specified address, specified in the destination offset field, of the destination node. In one scenario, the destination node may indicate in the associated acknowledge packet that the write transaction is complete, i.e., that the write packet was successfully accepted and that no response packet will follow. In another scenario, the destination node transmits to the source node first an acknowledge packet indicating that the write transaction is pending followed by a response packet indicating the completion status of the write transaction. The completion status, referred to as a response code, may indicate successful completion of the transaction or error conditions. One such error condition is that a resource conflict was detected and that the request may be retried.

In the case of a write request packet, the transaction code indicates either a write request for data quadlet or write request for data block. Preferably, if the amount of data is a quadlet, the write request for data quadlet transaction code is used. If the amount of data is not equal to a quadlet, the write request for data block transaction code is used. The destination offset specifies the lower 48 bits of the address within the destination node to which the data is to be written.

Figure 2:
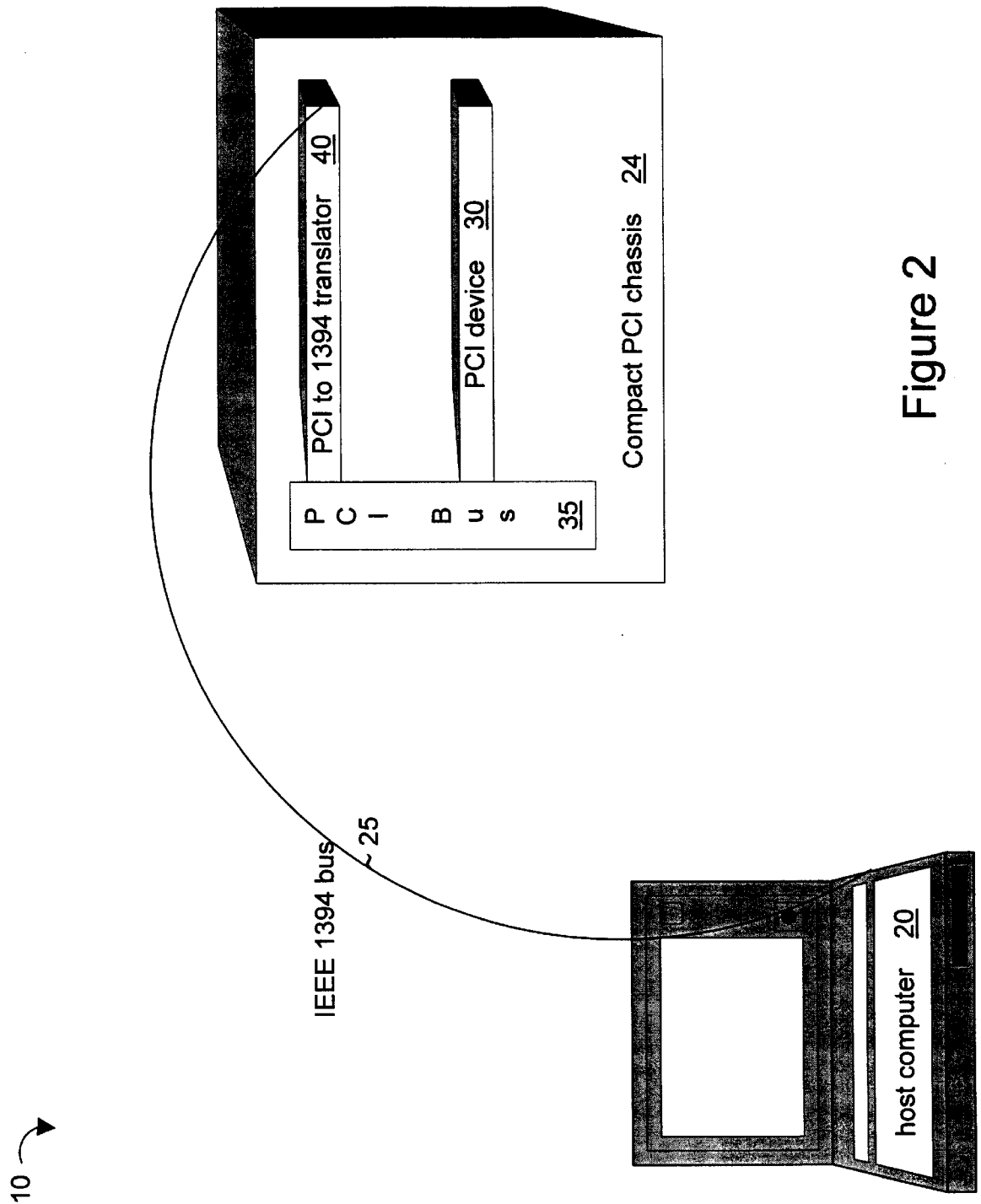
FIG. 2 is an illustration of the computer system of FIG. 1.

The translator 40 advantageously enables the PCI device 30 to communicate with the host computer 20 on the 1394 bus 25. The translator 40 enables the communication by translating one or more PCI cycles initiated by the PCI device 30 into 1394 transactions with the host computer 20, in particular by translating the one or more PCI cycles addresses into 1394 addresses and exchanging 1394 data transmission packets with the host computer to transfer data associated with the PCI cycles. Conversely, the translator 40 receives 1394 request packets from the host computer 20 and translates them into PCI cycles targeted at the PCI device. In particular the translator 40 translates the 1394 address from the request packet into a PCI cycle address and transfers the data in the packet to or from the PCI device during the PCI cycle as appropriate. The PCI device 30 can thereby enjoy the benefits of the 1394 bus, such as being located physically remote from the host computer 20, for example in an enclosure separate from the host computer 20 enclosure, as shown in FIG. 2. In one embodiment, the translator 40 and PCI device 30 are comprised inCompact PCI circuit boards and are coupled to the PCI bus 35 within a Compact PCI chassis 24, as shown in FIG. 2. The translator 40 advantageously enables existing PCI devices to couple to an IEEE 1394 bus without modification, thus leveraging the large installation base of PCI devices.

The translator 40 enables already existing device driver software executing in the host computer 20 to control the PCI device 30 with minor modification. Preferably, the minor modifications to the device driver include changing device driver operations which access registers or memory of the PCI device 30 via memory mapped operations, e.g., via assignment statements, to function calls which perform the register or memory accesses via 1394 packets transmitted and received by a 1394 bus interface 22 comprised in the host computer 20. In one embodiment, the functions called by the device driver to perform register or memory accesses via 1394 packets include a standard applications programming interface (API) supplied by Microsoft® Windows® operating systems. Furthermore, minor software modifications may also be required to set up buffers in the memory of the host computer 20 for performing data transfers. Furthermore, minor software modifications may also be required with regard to interrupt handing.

The PCI read and write cycles initiated by the PCI device 30 are often sequential, i.e., the addresses of two or more PCI transactions in the same direction are in sequence. For example, if the PCI device 30 is a data acquisition (DAQ) device, the DAQ device may acquire a large amount of data, say 128 bytes of data, and transfer the 128 bytes of acquired data to the host computer 20 in a 128 byte buffer at a specified address in the memory of the host computer 20. The PCI device 30 might transfer the 128 bytes of data as four separate PCI write cycles of 32 bytes each. The first PCI write cycle would be for 32 bytes to an address, e.g., 0x00100000. The second PCI write cycle would be for 32 bytes to address 0x00100020. The third PCI write cycle would be for 32 bytes to address 0x00100040. The fourth PCI write cycle would be for 32 bytes to address 0x00100060. Thus, the addresses of the four PCI write cycles are in sequence.

Similarly, PCI read transactions often occur as sequential read transactions. For example, if the PCI device 30 were a disk controller, large amounts of sequential data, such as a sector (512 bytes) of data may be written to the PCI device 30. If the PCI device 30 is a PCI bus master device, the PCI device 30 will perform multiple sequential PCI read cycles to obtain the data from the host computer 20 in order to write the data to disk drives connected to the disk controller. The translator 40 advantageously provides methods for improving the performance of sequential PCI read or write transactions initiated by the PCI device 30 as will be described below.

The host computer 20 comprises any computer including a 1394 bus interface 22 for coupling to the 1394 bus 25 and logic for performing the 1394 bus protocol. The 1394 bus interface 22 comprises logic for transmitting, receiving and processing 1394 bus packets. Preferably, the 1394 bus interface comprises a 1394 bus adapter for adapting the 1394 bus 25 to an expansion bus of the host computer 20, such as a PCI bus. Preferably, the host computer 20 includes device driver software for controlling the 1394 bus adapter. Preferably, the host computer 20 includes device driver software for controlling the PCI device 30 through the 1394 bus adapter and translator 40.

The PCI device 30 is a device which includes a PCI interface for coupling to the PCI bus 35. In one embodiment, the PCI device 30 is an instrument, such as an oscilloscope, multimeter, pressure sensor, data acquisition device, etc. with a PCI interface. Preferably, the PCI device 30 is a device which would be capable of plugging into a PCI bus expansion slot of the host computer 20. However, the translator 40 advantageously enables the PCI device 30 to be plugged into a "remote" PCI bus, i.e., PCI bus 35, and thus remotely controlled by the host computer 20 over the 1394 bus 25. The PCI device 30 includes control and status registers which are accessed by the host computer 20 to control the operation of the PCI device 30. The PCI device 30 may also include memory accessible via the PCI bus 35.

The translator 40 operates as a PCI target to receive PCI bus read and write cycles from PCI device 30 and translate the PCI cycles into corresponding 1394 read and write transactions on the 1394 bus 25. The translator 40 operates as an IEEE 1394 bus node to receive IEEE 1394 request packets and translate the request packets to corresponding PCI read or write transactions on the PCI bus 35. The operation of the translator 40 will be described in more detail below. In the preferred embodiment, the translator 40 enables one or more PCI devices to communicate with the host computer 20. Preferably, the translator 40 also enables one or more 1394 devices to communicate with the one or more PCI devices.

Figure 1A:
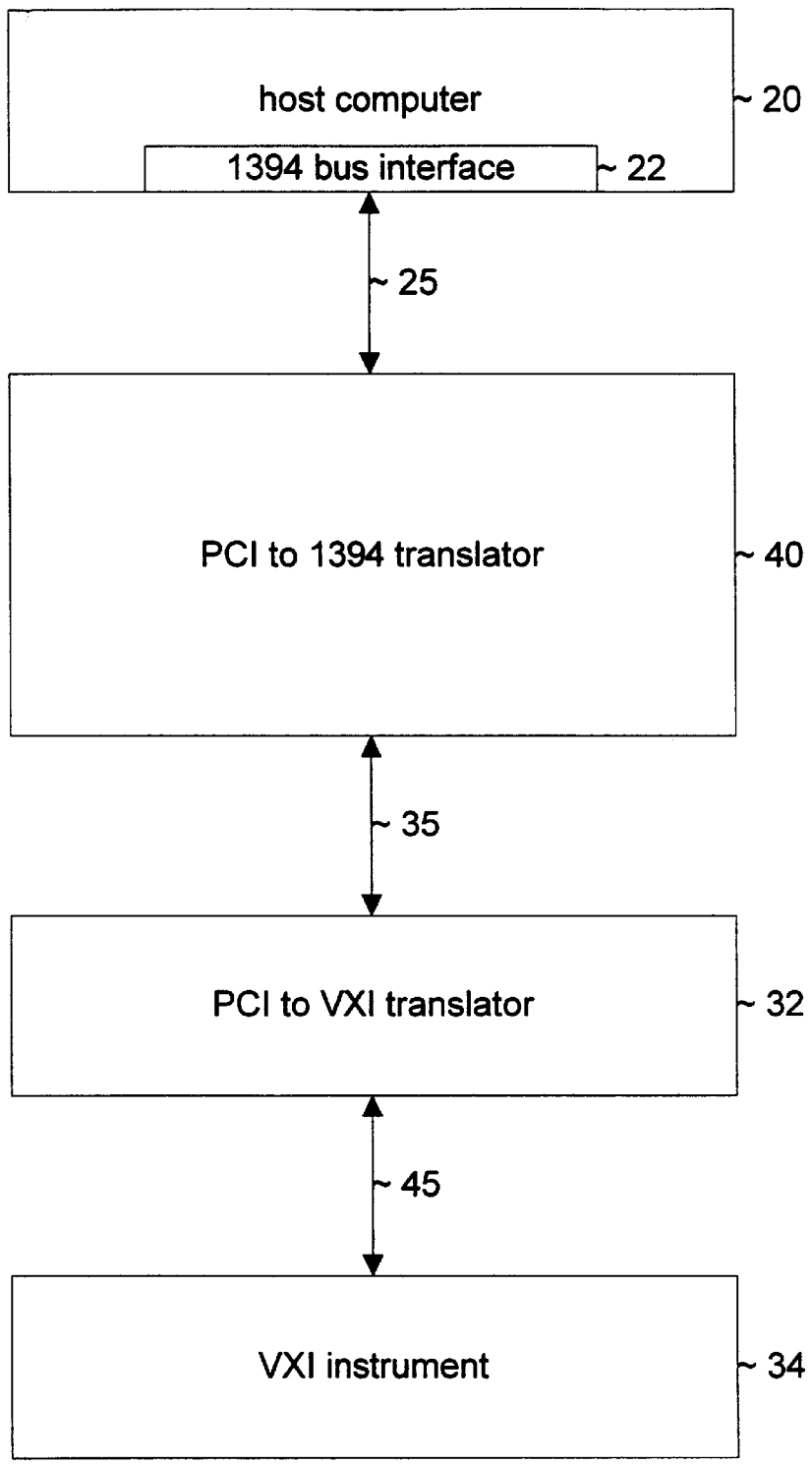
FIGS. 1a and 1b are block diagrams of computer systems employing a PCI bus to IEEE 1394 bus translator according to alternate embodiments of the present invention.

Referring now to FIG. 1a, an instrumentation control system 10a employing a Peripheral Component Interconnect (PCI) bus to IEEE 1394 bus translator 40 according to an alternate embodiment of the present invention is shown. The system 10a is similar to the system 10 of FIG. 1 and corresponding elements are numbered identically for clarity and simplicity. In the instrumentation control system 10a, the PCI device 30 of FIG. 1 comprises a PCI to VMEbus eXtensions for Instrumentation (VXI) translator 32 coupled to a VXI instrument 34 by a VXI bus 45.

The VXI instrument 34 is an instrument, such as an oscilloscope, multimeter, pressure sensor, data acquisition device, etc. including a VXI bus interface for coupling to the VXI bus 45. Preferably, the VXI instrument 34 is a software controlled instrument, i.e., is controlled by software executing on the host computer 20.

Figure 2A:
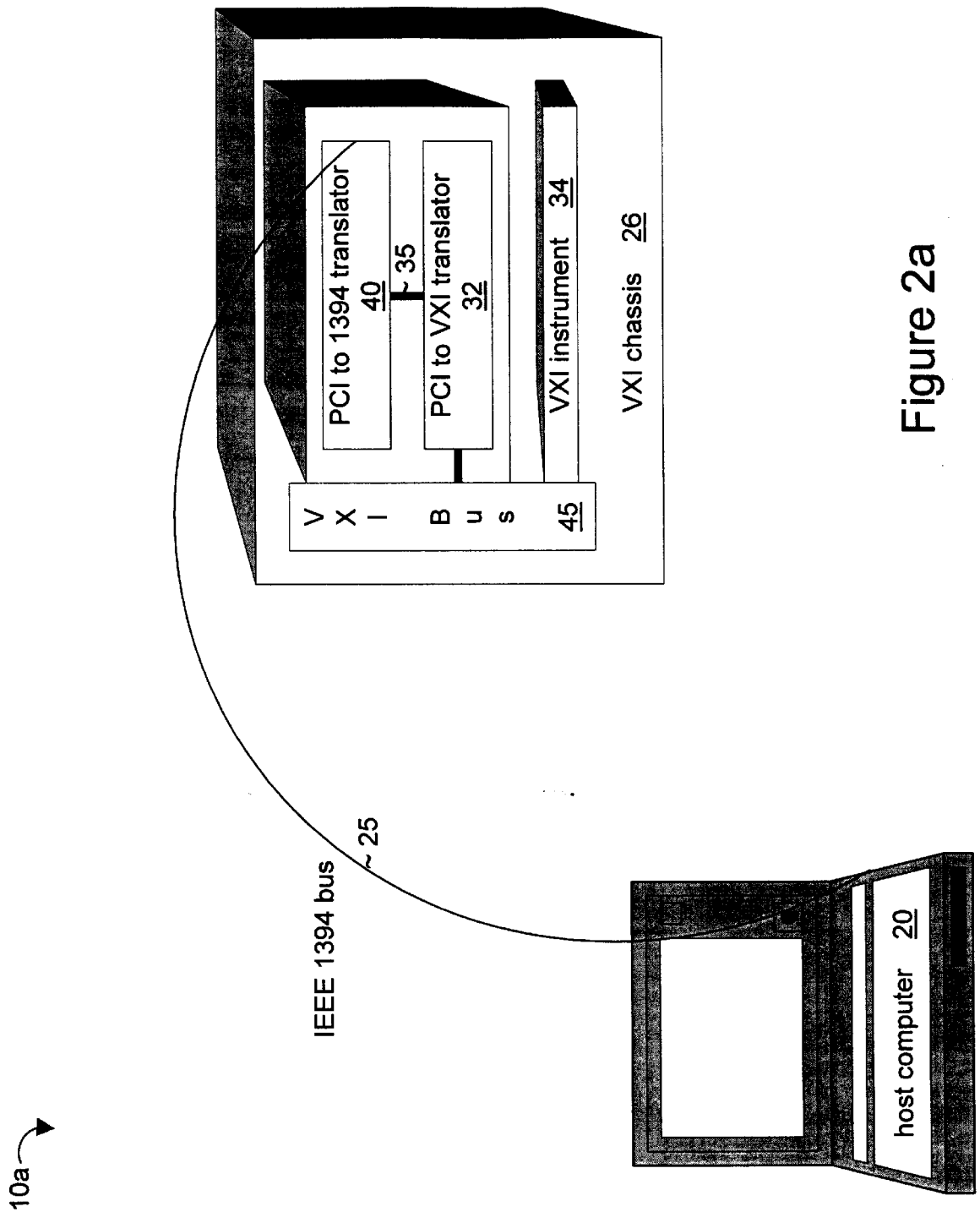
FIGS. 2a and 2b are illustrations of the computer systems of FIGS. 1a and 1b, respectively.

The PCI to VXI bus translator 32 operates as a PCI target to receive PCI 35 bus read and write cycles and translate the PCI cycles to corresponding VXI cycles on the VXI bus 45. The PCI to VXI bus translator 32 operates as a VXI target to receive VXI bus 45 read and write cycles and translate the VXI cycles to corresponding PCI cycles on the PCI bus 35. Thus, the translator 40 in conjunction with the PCI to VXI bus translator 32 advantageously enable the host computer 20 to control the VXI instrument 34 in a manner which enjoys the benefits of the 1394 bus, such as being located physically remote from the host computer 20, for example in a VXI mainframe 26, as shown in FIG. 2a. In one embodiment, the translator 40 and PCI to VXI translator 32 are coupled together by a PCI bus comprised within a circuit board which is connected to the VXI instrument 34 by a VXI bus 45 in the VXI mainframe 26, as shown in FIG. 2a. The translator 40 thus is potentially superior to previous parallel bus solutions for remotely interfacing a host computer to a VXI instrument chassis, such as the Multisystem eXtension Interface (MXI) bus, since the 1394 bus, being a serial bus, is potentially lower cost and uses a smaller, more mechanically desirable cable.

Also, the use of PCI to 1394 translator 40 and PCI to VXI translator 32 enables existing VXI devices or instruments to couple to an IEEE 1394 bus without any modifications. This enables VXI instrument connectivity to an IEEE 1394 bus while leveraging the large installed base of existing VXI instruments.

Figure 1B:
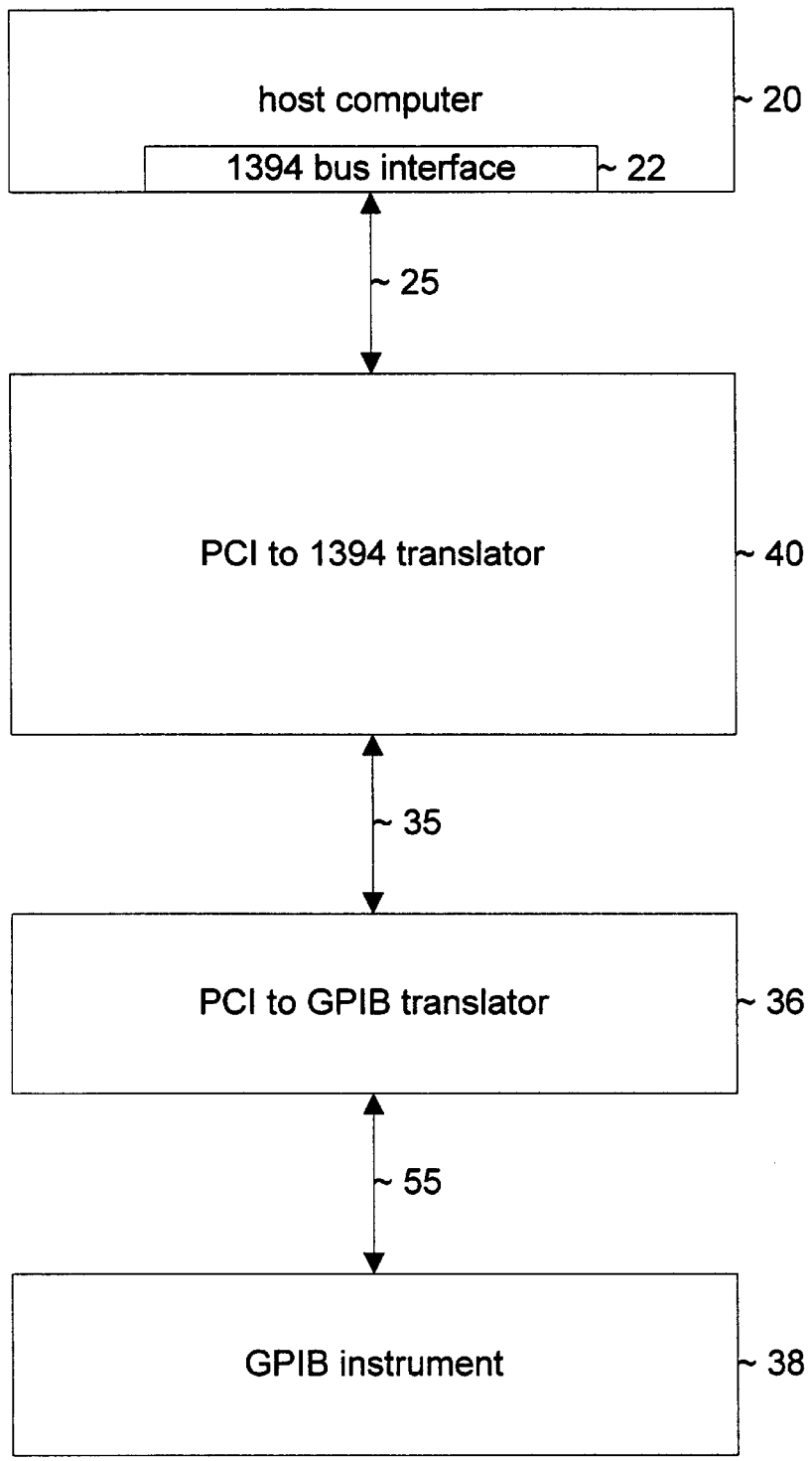

Referring now to FIG. 1b, an instrumentation control system 10b employing a Peripheral Component Interconnect (PCI) bus to IEEE 1394 bus translator 40 according to an alternate embodiment of the present invention is shown. The system 10b is similar to the system 10a of FIG. 1a and corresponding elements are numbered identically for clarity and simplicity. In the instrumentation control system 10b, the PCI device 30 of FIG. 1 comprises a PCI to GPIB translator 36 coupled to a GPIB instrument 38 by a GPIB bus 55.

The GPIB instrument 38 is an instrument, such as an oscilloscope, multimeter, pressure sensor, data acquisition device, etc. including a GPIB bus interface for coupling to the GPIB bus 55. Preferably, the GPIB instrument 38 is a software controlled instrument, i.e., is controlled by software executing on the host computer 20.

Figure 2B:
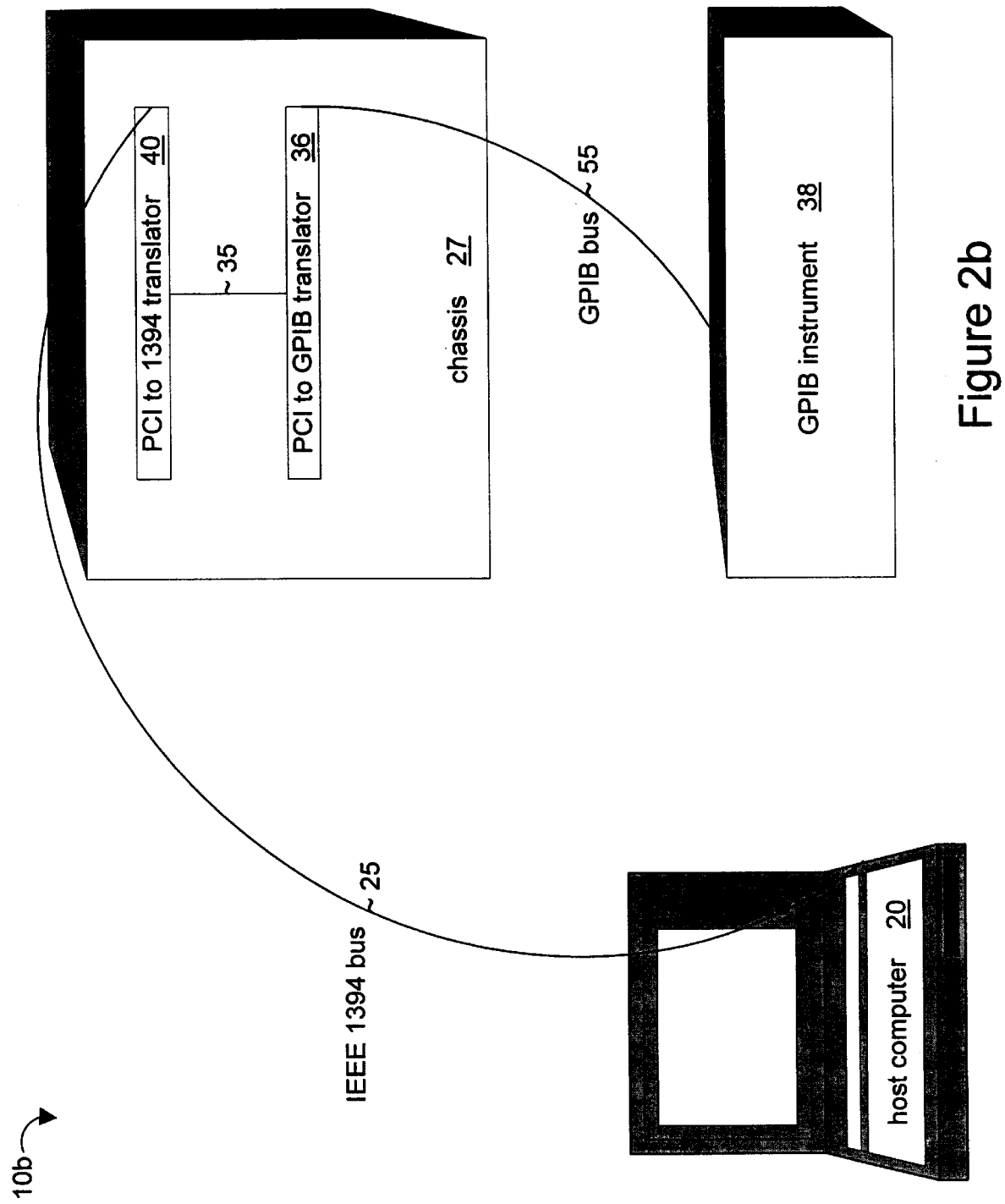

The PCI to GPIB bus translator 36 operates as a PCI target to receive PCI 35 bus read and write cycles and translate the PCI cycles to corresponding GPIB transactions on the GPIB bus 55. Conversely, the PCI to GPIB bus translator 36 operates as a GPIB device to translate GPIB transactions to corresponding PCI cycles on the PCI bus 35. In one embodiment, the translator 40 and PCI to GPIB translator 36 arc coupled to the PCI bus 35 within a standalone chassis 27, as shown in FIG. 2b. The use of the PCI to 1394 translator 40 and PCI to GPIB translator 36 enables existing GPIB devices or instruments to couple to an IEEE 1394 bus without any modifications. This enables GPIB instrument connectivity to an IEEE 1394 bus while leveraging the large installed base of existing GPIB instruments.

Figure 3:
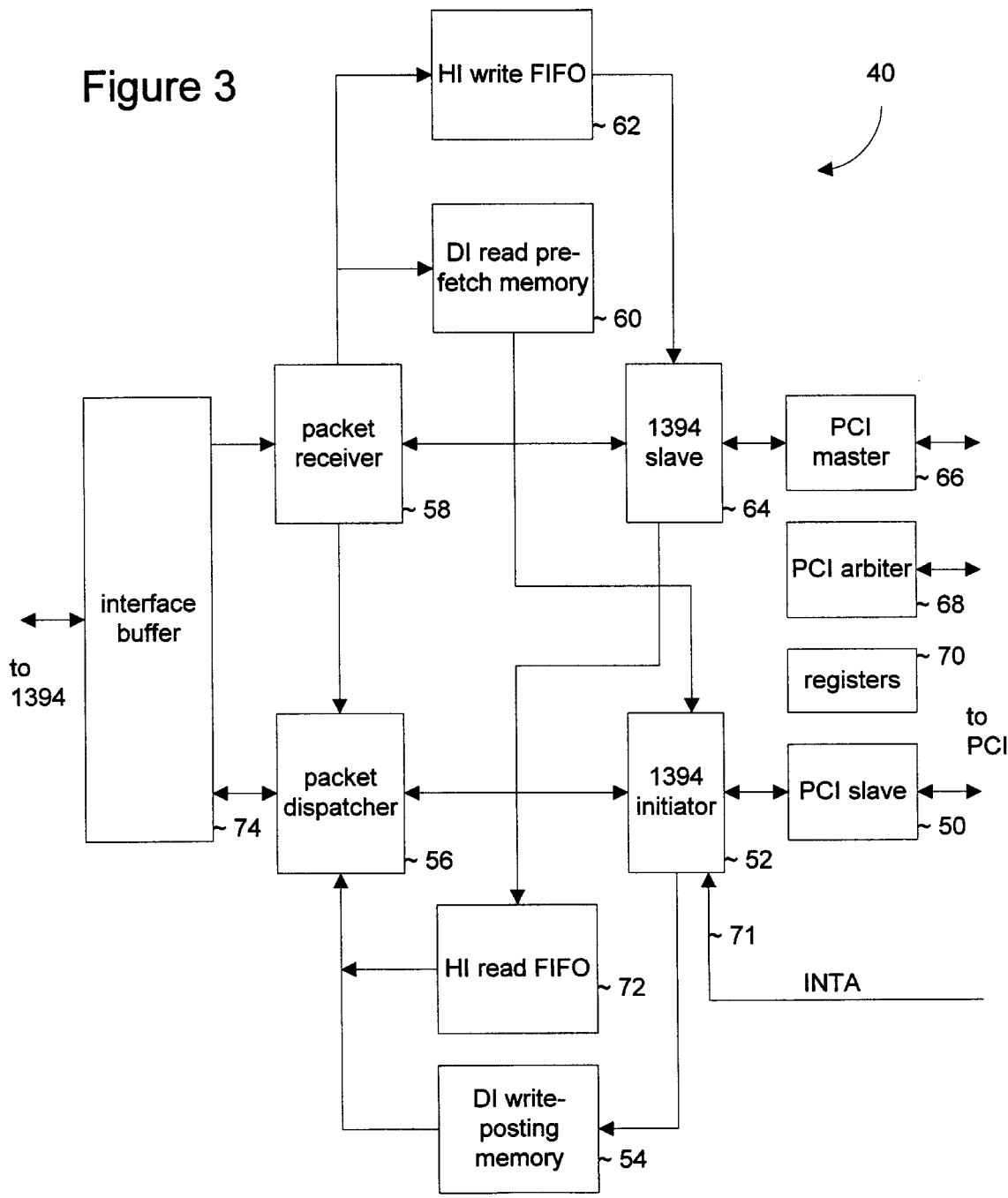
FIG. 3 is a block diagram of the PCI bus to IEEE 1394 bus translator of FIG. 1.

FIG. 3—Translator Block Diagram

Referring now to FIG. 3, a block diagram of the PCI bus to IEEE, 1394 bus translator 40 of FIG. 1 is shown. The translator 40 includes PCI slave logic 50, PCI master logic 66, and a PCI arbiter 68, which comprise a PCI interface portion of the translator 40, coupled to the PCI bus 35. The PCI slave 50 is operable to function as the target of a PCI bus cycle, such as a PCI bus write or read cycle, initiated by the PCI device 30 (of FIG. 1). Data transfers between the PCI device 30 and the host computer 20 which are initiated by the PCI device 30 are referred to herein as "device-initiated (DI)" transactions, e.g., DI reads and DI writes. Data transfers between the PCI device 30 and the host computer 20 which are initiated by the host computer 20 are referred to herein as "host-initiated (HI)" transactions, e.g., HI reads and HI writes. The PCI slave 50 performs decode of PCI bus 35 addresses to determine whether the translator 40 is being addressed as the target of a PCI bus cycle. Preferably, the PCI slave 50 decodes PCI bus addresses in the range 0 through 0x7FFFFFFF as destined for the translator 40.

The PCI slave 50 is coupled to 1394 initiator logic 52. The 1394 initiator 52 communicates with the PCI bus 35 via the PCI slave 50. For DI writes, the 1394 initiator 52 receives data transmitted by the PCI device 35 from the PCI slave 50 and writes the data to a DI write-posting memory 54 coupled to the 1394 initiator 52. For DI reads, data received from the 1394 bus is placed in a DI read pre-fetch memory 60. The 1394 initiator 52 reads data from the DI read pre-fetch memory 60 and provides the data to the PCI slave 50 for transmission on the PCI bus 35 to the PCI device 30. Preferably, the DI write-posting memory 54 and DI read pre-fetch memory 60 comprise first-in-first-out (FIFO) memories. In an alternate embodiment, the posting memory 54 and pre-fetch memory 60 comprise random access memory (RAM) rather than FIFO memory.

The 1394 initiator 52 is responsible for translating the PCI cycle addresses into 1394 addresses, as will be described below. The 1394 initiator 52 is also responsible for determining when sequential DI write cycles have occurred which can be combined into a single 1394 write request packet and when sequential DI read cycles have occurred for which data can be read from the pre-fetch memory 60, as will be described below. The 1394 initiator 52 is also responsible for performing pipe-lining of DI read and write operations, as will be described below.

A packet dispatcher 56 is coupled to the 1394 initiator 52 and DI write-posting memory 54. The packet dispatcher 56 constructs 1394 packets for transmission on the 1394 bus 25 to the host computer 20. The packet dispatcher 56 constructs 1394 request and response packets. The packet dispatcher 56 uses data in the DI write-posting memory 54 to populate the data payload portion of 1394 write request packets. The packet dispatcher 56 uses data in a HI read FIFO 72 to populate the data payload portion of 1394 read response packets.

The packet dispatcher 56 also receives control signals from the 1394 initiator 52. Preferably, the control signals from the 1394 initiator 52 include destination offset signals. The 1394 initiator 52 translates PCI cycle addresses into 1394 destination offsets, as will be described in detail below, and provides the destination offsets to the packet dispatcher 56 on the control signals. The packet dispatcher 56 uses the destination offsets to populate 1394 request packet destination offset fields. The packet dispatcher 56 also constructs 1394 response and acknowledge packets based on control signals from the 1394 initiator 52 and a packet receiver 58 coupled to the packet dispatcher 56. The control signals from the 1394 initiator 52 to the packet dispatcher 56 also include indication of a read or write operation, the length of the data to be included in a packet, and the presence of data in the DI write-posting memory 54 to be sent. The packet dispatcher 56 also provides control signals to the 1394 initiator 52 including indication of ownership of the 1394 bus 25, acknowledgment of a DI data transfer and indication of an error.

The packet dispatcher 56 provides the packets to an interface buffer 74 for transmission on the 1394 bus 25. The packet dispatcher 56 also performs transmission related services such as requesting control of the 1394 bus 25 and packet cyclic redundancy code (CRC) information generation. The packet dispatcher 56 provides control signals to the interface buffer 74 to indicate the required transmission speed, preferably 100 megabits per second (Mbs), 200 Mbs, or 400 Mbs. Preferably, the interface buffer 74 is coupled to an IEEE 1394 physical layer (PHY) circuit, wherein the PHY circuit couples directly to the 1394 bus 25.

The packet receiver 58 receives incoming 1394 packets from the interface buffer 74. The packet receiver 58 performs a CRC check on the incoming packets. In the case of a 1394 data transmission packet, the packet receiver 58 decodes the destination node ID in the packet header to determine if the packet is destined for the translator 40. If the packet is destined for the translator 40, the packet receiver 58 extracts the data payload portion of the packet. The packet receiver 58 writes the data to the DI pre-fetch memory 60 or a HI write FIFO 62 depending upon whether the data received is associated with a DI read or HI write operation. The packet receiver 58 passes the header information, including the destination offset, data length, and read/write information, to a 1394 slave 64. The packet receiver 58 also provides control signals to the packet dispatcher 56. The control signals include acknowledge packet codes, source IDs, response codes, and other information received from the host computer 20, as well as acknowledge packet codes to be sent to the host computer 20.

The DI write-posting memory 54, as will be described below, advantageously enables the translator 40 to write post the data from multiple DI PCI write cycles if the addresses of the write cycles are in sequence. The write posted data from the multiple DI PCI write cycles can then be combined into a single 1394 write request packet, rather than having to generate and transmit multiple 1394 write request packets. This write posting and combining improves the overall throughput of DI write operations by reducing the number of 1394 transactions. The DI write-posting memory 54 further enables the translator 40 under certain conditions, as will be described below, to pipe-line DI write operations, thus improving the overall throughput of DI write operations.

The DI read pre-fetch memory 60, as will be described below, advantageously enables the translator 40 to pre-fetch data from the host computer 20 in response to a first PCI read cycle initiated by the PCI device 30, thus improving the performance of second and subsequent sequential PCI read cycles initiated by the PCI device 30 by reducing the number of 1394 transactions. The DI read pre-fetch memory further enables the translator, as will be described below, to pipe-line DI read operations, thus improving the overall throughput of DI read operations.

The 1394 slave 64 interacts with the HI read FIFO 72 and the HI write FIFO 62 and communicates with PCI master logic 66 to perform data transfers initiated by the host computer 20, i.e., HI transactions. In response to a 1394 request packet from the host computer 20, i.e., an HI read or write, the 1394 slave 64 translates the 1394 address, in particular the destination offset portion, into a PCI bus cycle address, as will be described in detail below.

In response to a 1394 read request packet from the host computer 20, i.e., an HI read, the 1394 slave becomes master of the PCI bus 35 through the PCI master 66 and performs one or more PCI read cycles using the translated PCI address to read the desired data from the PCI device 30 into the HI read FIFO 72. The packet dispatcher 56 then reads the data from the HI read FIFO 72 and constructs an appropriate 1394 response packet including the data and transmits the response packet to the host computer 20. Preferably, the type of PCI cycle performed, i.e., memory, I/O, or configuration cycle, is specified in the destination offset of the request packet, as described below.

In response to a 1394 write request packet from the host computer 20, i.e., an HI write, the packet receiver 58 writes the data of the data payload portion of the write request packet to the HI write FIFO 62. The 1394 slave then reads the data from the HI write FIFO 62, becomes master of the PCI bus 35 through the PCI master 66, and performs one or more PCI write cycles using the translated PCI address to write the data to the PCI device 30.

The translator 40 further comprises a PCI arbiter 68 which arbitrates between the translator PCI master 66 itself and the PCI device 30 for control of the PCI bus 35. Preferably, one or more PCI devices may be coupled to the PCI bus 35 and the PCI arbiter 68 is configured to arbitrate between the translator PCI master 66 and the one or more PCI devices.

The translator 40 further comprises registers 70 which may be accessed from both the 1394 bus 25 and the PCI bus 35. Preferably, the registers 70 include 1394-related registers, PCI-related registers, and translator specific registers. A portion of the registers 70 are shown in FIG. 4.

Figure 4:
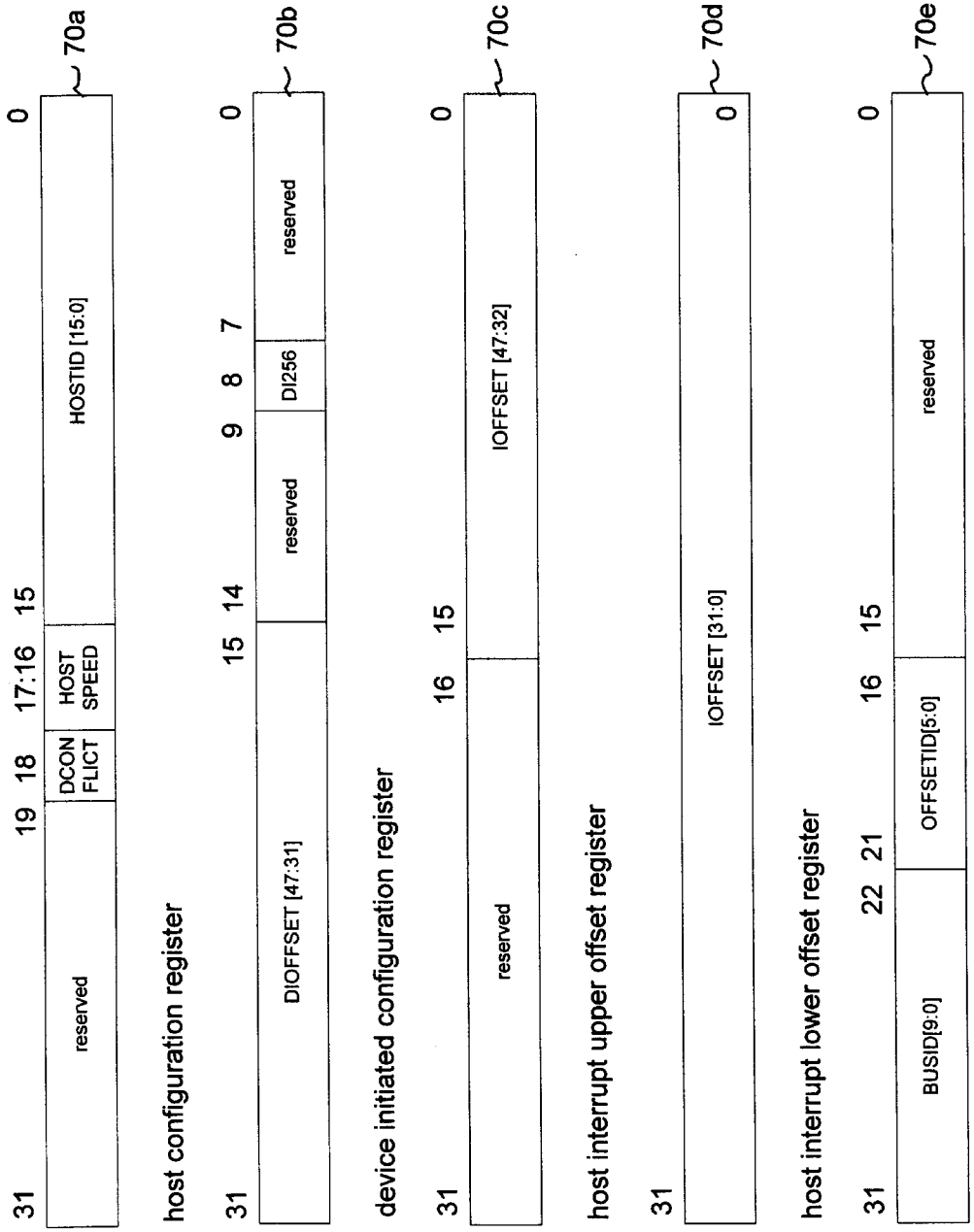
FIG. 4 is a diagram illustrating some of the registers in the translator of FIG. 1.

FIG. 4—Translator Registers 70

Referring now to FIG. 4, a diagram illustrating some of the registers 70 is shown. The translator specific registers include a host configuration register 70*a* which includes bits HOSTID[15:0] for specifying the 1394 node ID of the host computer 20. The packet dispatcher 56 uses the HOSTID bits to populate the destination ID field of the 1394 request packets sent to the host computer 20. The host configuration register 70*a* also includes HOST SPEED bits for specifying which of the possible 1394 data transmission speeds is to be used to send 1394 request packets to the host computer 20. The host configuration register 70*a* also includes a DCONFLICT bit, which is a configurable bit for enabling DI write pipe-lining when resource conflicts are not expected from the host computer 20, which will be described in more detail below. Preferably, the host computer 20 programs the host configuration register 70*a*.

The translator specific registers also include a device initiated configuration register 70*b* which includes DIOFFSET[47:31] bits for specifying the upper address bits not supplied by the PCI address, i.e., bits 31 through 47, of the 1394 data transmission packet header destination offset, as will be described below. The device initiated configuration register 70*b* also includes a configurable D1256 bit for specifying the amount of data requested by a 1394 read request packet to perform read pre-fetching, as will be described below. Preferably, the translator 40 will pre-fetch 64 bytes of data if the D1256 bit is 0 and 256 bytes if the D1256 bit is 1.

The registers 70 also include a host interrupt upper offset register 70*c* and a host interrupt lower offset register 70*d* which include IOFFSET[47:0] bits. The IOFFSET bits are used to supply the destination offset field of a 1394 write request packet sent to the host computer 20 to generate an interrupt to the host computer 20, in response to an interrupt being generated by the PCI device 30 on an interrupt request line INTA 71 coupled to the 1394 initiator 52. Preferably, the host computer 20 programs the IOFFSET bits with a predetermined value. When the host bus adapter 22 of the host computer 20 receives a 1394 write request packet from the translator 40 with the predetermined address programmed into the IOFFSET bits, the adapter 22 generates an interrupt request or equivalent to the host computer 20 processor.

The registers 70 also include a 1394-defined node_ids register 70e which is used to identify and modify the current 1394 bus_ID value and a non-modifiable physical_ID value of the translator 40. The BUSID[9:0] bits provide a mechanism for reconfiguring the initial 1394 bus node address space. The OFFSETID[5:0] bits contain the translator 40 node's 1394 physical ID value.

In one embodiment, the translator 40 comprises a field-programmable gate array (FPGA) coupled to external FIFO memories or static random access memory (SRAM), which comprise the DI read pre-fetch memory 60, DI write-posting memory 54, the HI write FIFO 62, and the HI read FIFO 72. In another embodiment, the translator 40 comprises one or more application-specific integrated circuits (ASICs). In this other embodiment, the memories may be external to the ASIC or integrated within the ASIC.

Figure 5:
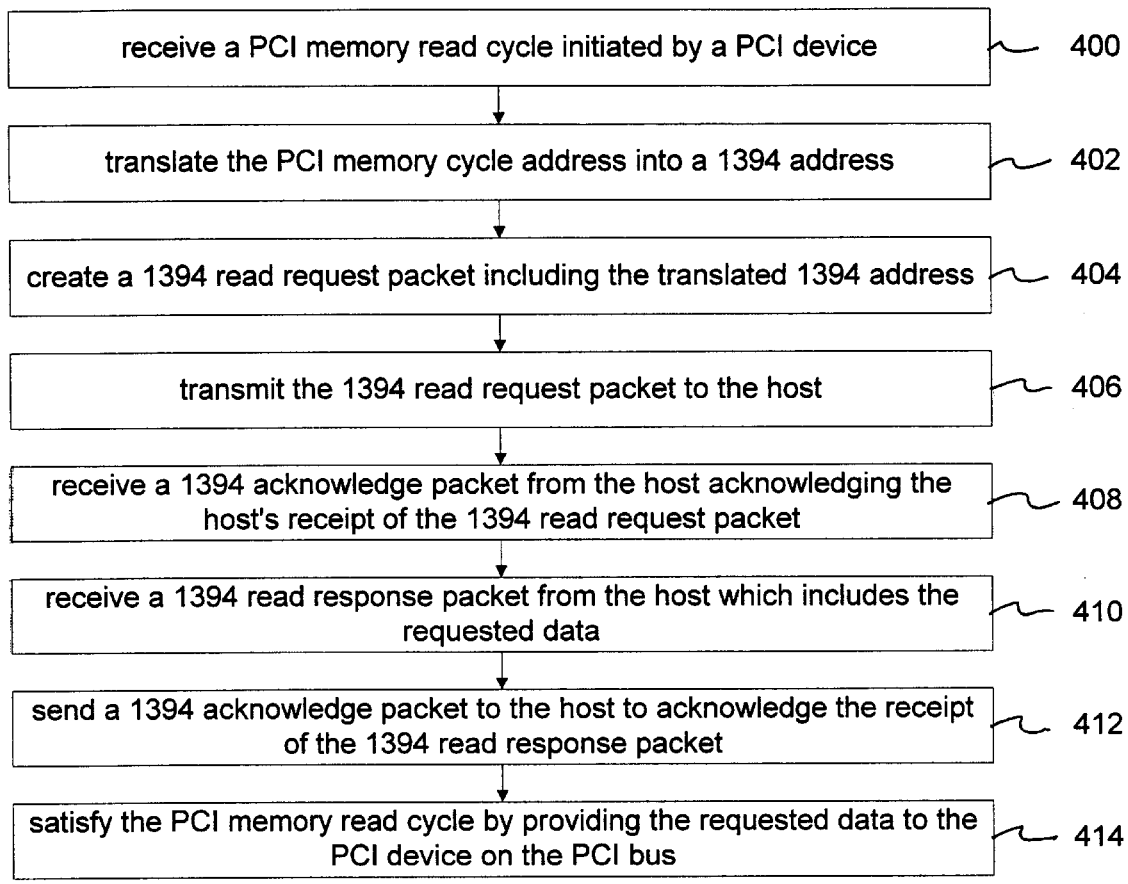
FIG. 5 is a flowchart illustrating steps taken by the translator of FIG. 1 in performing translation of PCI device-initiated read operations.

FIG. 5—DI read flowchart

Referring now to FIG. 5, a flowchart is shown illustrating steps taken by the translator 40 of FIG. 1 in performing translation of DI read operations. The PCI device 30 initiates a PCI bus memory read cycle. The PCI memory read cycle includes a PCI bus address. The PCI slave 50 decodes the PCI memory address and determines that the read cycle is targeted at the translator 40 and receives the read cycle, in step 400. Preferably, the PCI slave 50 determines PCI addresses in the lower half of the PCI address space, i.e., 0x00000000 through 0x7FFFFFFF, are targeted at the translator 40. Preferably, the 1394 initiator 52 latches the PCI cycle address in order to translate the PCI address into a 1394 address, in step 402, as will be described in more detail with reference to FIG. 6.

Figure 6:
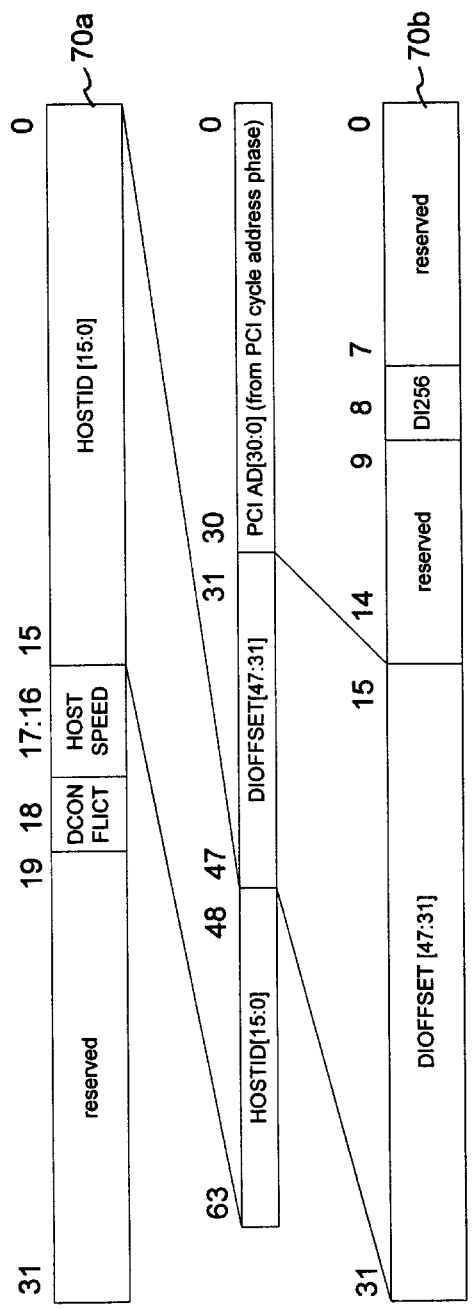
FIG. 6 is a diagram illustrating translation of a PCI address to a 1394 address.

FIG. 6—PCI address to 1394 address translation

Referring now to FIG. 6, a diagram illustrating translation of a PCI bus cycle address to a 1394 address is shown. When translating a PCI memory cycle address into a 64-bit 1394 request packet destination address, the 1394 initiator 52 assigns bits 30 through 0 from the PCI address, i.e., PCI address/data (AD) signals[30:0], to the lower 30 bits of the 1394 destination address. The 1394 initiator 52 assigns the DIOFFSFT[47:31] bits from the device initiated configuration register 70b to bits 47 through 31 of the 1394 destination address. The 1394 initiator 52 assigns the HOSTID [15:01] bits from the host configuration register 70a to bits 63 through 48 of the 1394 destination address. Thus, the 1394 initiator 52 translates the PCI address into a 1394 address, as in step 402 of FIG. 5.

Advantageously, the translator 40 automatically translates PCI bus memory cycle addresses into 1394 addresses in response to PCI bus cycles initiated by the PCI device 30. It is noted that this is advantageous and different from the operation of present PCI to 1394 bus adapters. With host bus adapters, a processor external to the host bus adapter determines the 1394 address and programs the 1394 address into the host bus adapter for each 1394 request packet to be transmitted. Advantageously, the translator 40 of the present invention acts as a PCI slave or target of a PCI cycle and automatically translates PCI cycle addresses into 1394 addresses, thereby enabling currently existing PCI devices to be remotely coupled to a host computer without modification.

Figure 6A:
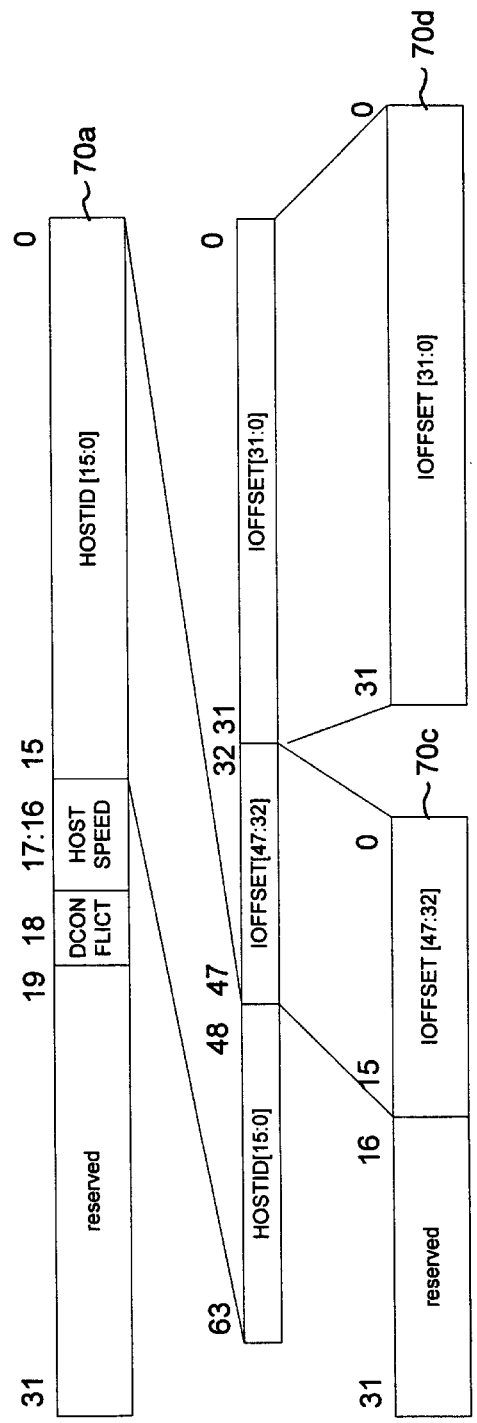
FIG. 6a is a diagram illustrating the creation of a 1394 address to be used to interrupt the host computer of FIG. 1.

Referring now to FIG. 6a, a diagram illustrating creation of a predetermined 1394 address to be used in generating an interrupt request on the host computer 20 is shown. As described previously with reference to FIG. 3, the translator 40 is also capable of receiving an interrupt request from the PCI device 30 and in response transmitting a 1394 write request packet to the host computer 20 in order to generate an interrupt request or equivalent to the host computer 20 processor. The 1394 initiator 52 assigns the IOFFSET[47:0] bits from the host interrupt upper and lower offset registers 70c and 70d, respectively, to bits 47 through 0 of the 1394 destination address. The 1394 initiator 52 assigns the HOSTID[15:0] bits from the host configuration register 70a to bits 63 through 48 of the 1394 destination address. When the host computer 20 receives the write request packet with the predetermined address, an interrupt or equivalent is generated to the host computer 20.

Referring again to FIG. 5, the 1394 initiator 52 provides the translated 1394 address to the packet dispatcher 56 which creates a 1394 read request packet including the translated 1394 address, in step 404. The read request packet is then transmitted to the host computer 20, in step 406. In response to receiving the read request packet, the host computer 20 transmits a 1394 acknowledge packet to the translator 40 to acknowledge the reception of the read request packet. The packet receiver 58 receives the acknowledge packet, in step 408.

The host computer 20 retrieves the data requested by the read request packet and sends a 1394 read response packet to the translator 40 which includes the data in the data payload portion of the read response packet. The packet receiver 58 receives the read response packet, in step 410, and writes the data to the DI read pre-fetch memory 60. Preferably, as will be described below with reference to FIG. 13, the translator 40 performs pre-fetching of data, i.e., requests more data than specified in the PCI read cycle, in order to improve DI read performance. In response to receiving the read response packet, the packet dispatcher 56 sends a 1394 acknowledge packet to the host to acknowledge the receipt of the read response packet, in step 412. The 1394 initiator 52 reads the data from the read pre-fetch memory 60 and satisfies the PCI memory read cycle by providing the requested data to the PCI device 30 on the PCI bus 35, in step 414.

Figure 7:
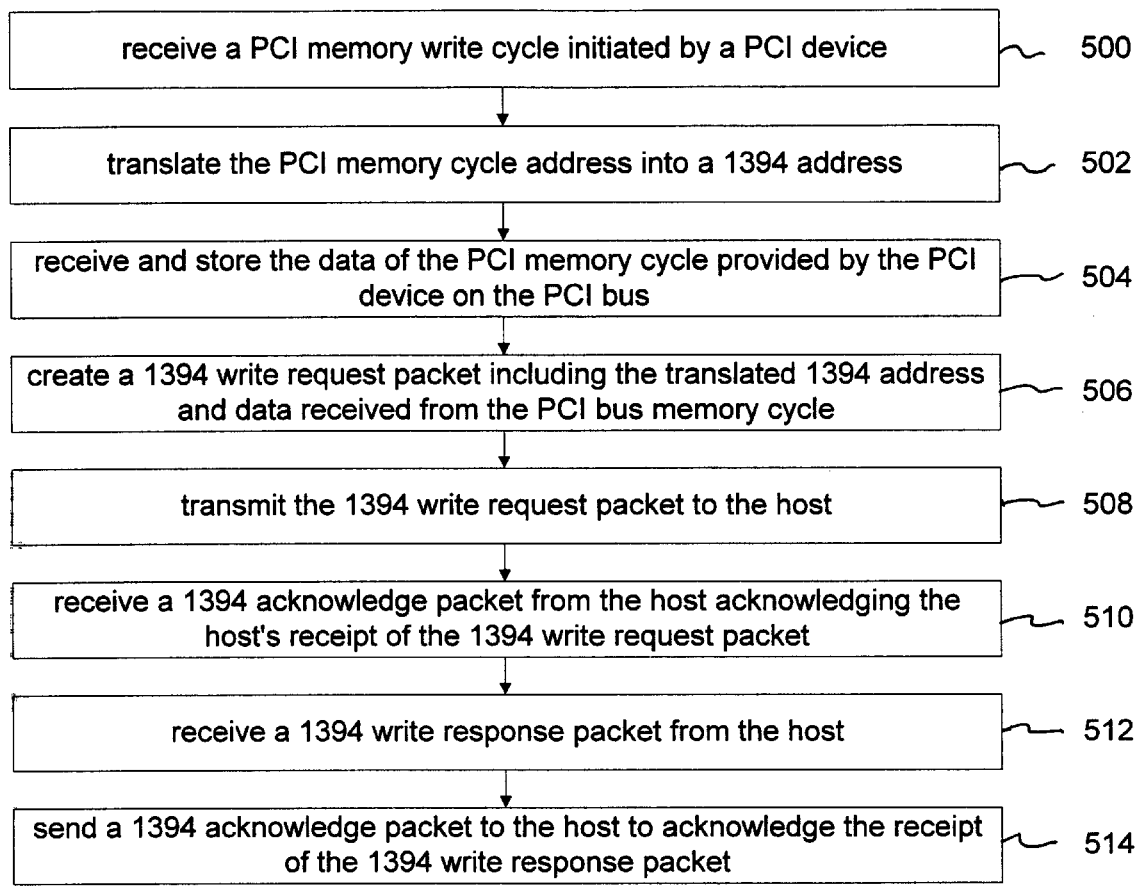
FIG. 7 is a flowchart illustrating steps taken by the translator of FIG. 1 in performing translation of PCI device-initiated write operations.

FIG. 7—DI write flowchart

Referring now to FIG. 7, a flowchart is shown illustrating steps taken by the translator 40 of FIG. 1 in performing translation of DI write operations. The PCI device 30 initiates a PCI bus memory write cycle including a PCI bus address. The PCI slave 50 decodes the PCI memory address and determines that the write cycle is targeted at the translator 40 and receives the write cycle, in step 500. Preferably, the 1394 initiator 52 latches the PCI cycle address in order to translate the PCI address into a 1394 address, in step 502, as was described with reference to FIG. 6.

The 1394 initiator 52 then receives the data of the PCI write cycle from the PCI bus 35 and writes the data to the DI write-posting memory 54, in step 504. Preferably, as will be described below with reference to FIGS. 12 and 12a, the translator 40 performs sequential write combining and write posting of data in order to improve DI write performance. The 1394 initiator 52 provides the translated 1394 address to the packet dispatcher 56 which reads the data from the DI write-posting memory 54 and creates a 1394 write request packet including the data in the data payload portion of the write request packet and including the translated 1394 address, in step 506. The write request packet is then transmitted to the host computer 20, in step 508. In response to receiving the write request packet, the host computer 20 transmits a 1394 acknowledge packet to the translator 40 to acknowledge the reception of the write request packet. The packet receiver 58 receives the acknowledge packet, in step 510.

The host computer 20 store the data provided by the write request packet and sends a 1394 write response packet to the translator 40. The packet receiver 58 receives the write response packet, in step 512. In response to receiving the write response packet, the packet dispatcher 56 sends a 1394 acknowledge packet to the host to acknowledge the receipt of the write response packet, in step 514.

Figure 8:
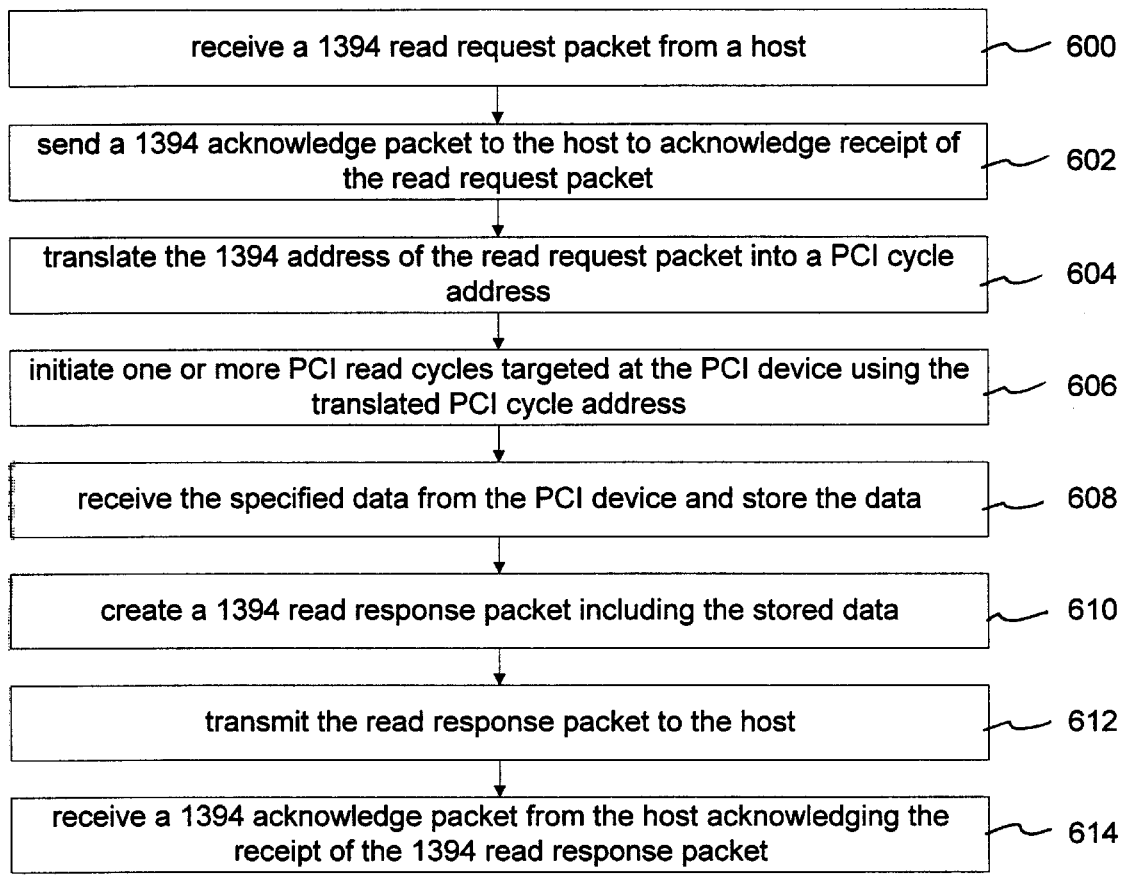
FIG. 8 is a flowchart illustrating steps taken by the translator of FIG. 1 in performing translation of host computer-initiated read operations.

FIG. 8—HI read flowchart

Referring now to FIG. 8, a flowchart is shown illustrating steps taken by the translator 40 of FIG. 1 in performing translation of HI read operations. The host computer 20 transmits a 1394 read request packet to the translator 40 in order to read data from the PCI device 30. The packet receiver 58 receives the read request packet, in step 600. In response to the read request packet, the packet dispatcher 56 creates and sends a 1394 acknowledge packet to the host computer 20 to acknowledge receipt of the read request packet, in step 602. The 1394 slave 64 receives the header information, in particular the 1394 address portion of the the packet receiver 58 determines whether or not the packet is destined for the translator 40 by comparing the destination_ID portion of the packet header with the BUSID and OFFSETID bits of the node_register 70e.

Figure 9:
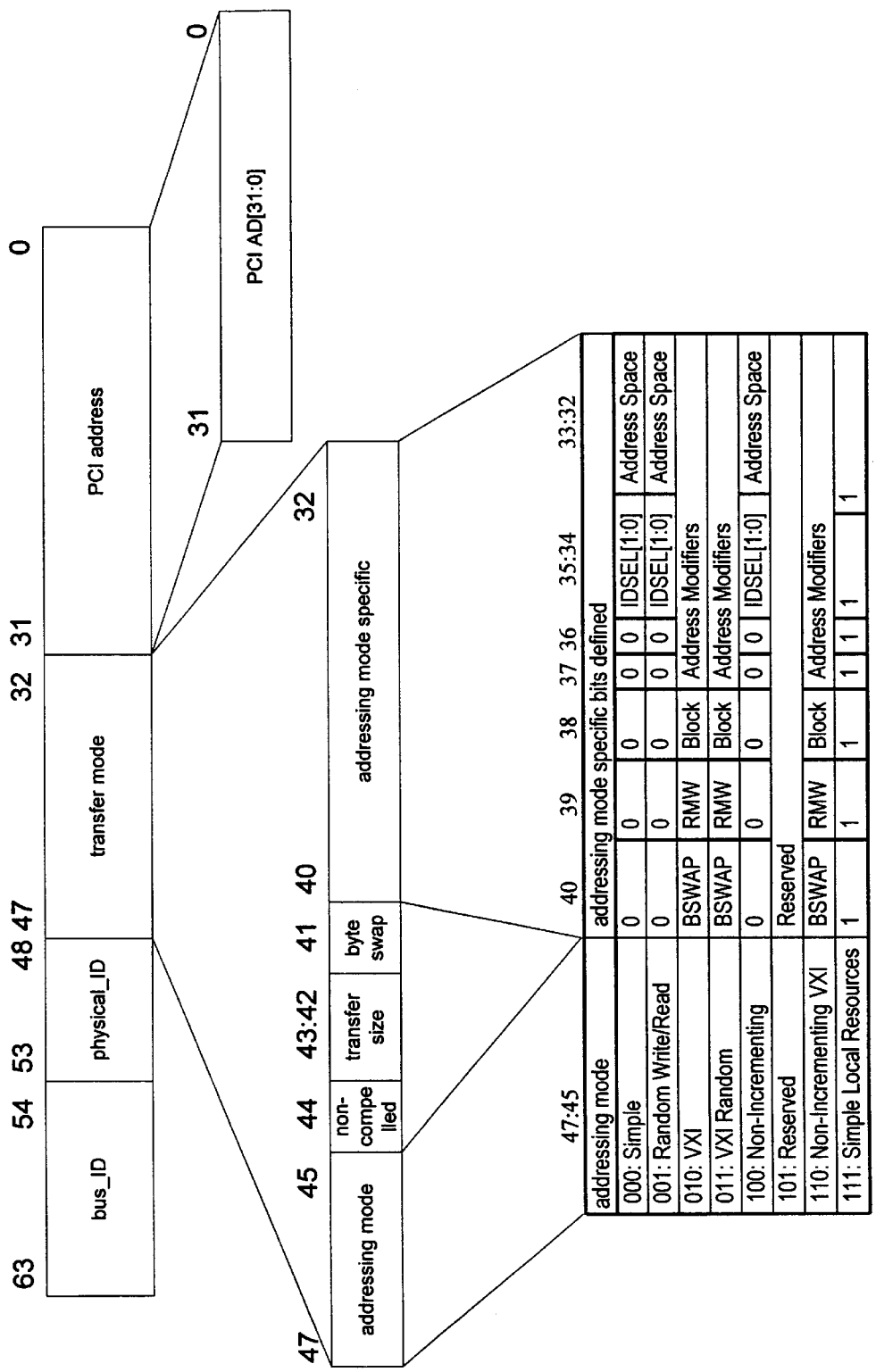
FIG. 9 is a diagram illustrating the translation of a 1394 address to a PCI address.

The packet receiver 58 provides the destination offset portion of the 1394 address, i.e., bits 47 through 0 shown in FIG. 9, to the 1394 slave 64 which interprets the upper 16 bits of the destination offset as a 16-bit transfer mode field and the lower 32 bits as a 32-bit PCI Address. The 1394 slave 64 translates the 32-bit PCI address portion into a PCI address which the PCI master 66 presents on the PCI AD[31:0] signals as the address of the PCI cycle initiated by the translator 40 targeted at the PCI device 30 in response to the reception of a 1394 request packet from the host computer 20, as described in FIGS. 8 and 10. Thus, advantageously the translator 40 automatically translates 1394 addresses into PCI addresses thereby enabling currently existing PCI devices to be remotely coupled to a host computer without modification.

The 1394 slave 64 interprets the transfer mode portion of the destination offset field into addressing mode, non-compelled, transfer size, byte swap, and addressing mode specific fields, as shown in FIG. 9. The addressing mode field specifies which of 8 different addressing mode may be specified by the host computer 20. The remaining bits in the transfer mode portion have different meaning depending on the addressing mode specified, as shown. Each of the addressing modes is described in Table 5 along with the binary value corresponding to each.

TABLE 5

| Code | Addressing Mode | Description |
| --- | --- | --- |
| 000 | Simple | Perform standard PCI transfers. If the 1394 transaction requires more than one PCI transaction, the translator 40 increments the PCI address automatically by 1, 2, or 4 depending on the PCI transfer size field value. |
| 001 | Random Write/Read | Perform a sequence of random PCI transfers. For reads, use the PCI addresses stored in a register file within registers 70. For writes, use address/data pairs in the data payload portion of the packet. |
| 010 | VXI | Perform standard PCI to VXI transfers with incrementing address by 1, 2, or 4 depending on the PCI transfer size field value. |
| 011 | VXI Random Write/Read | Perform a sequence of random PCI to VXI transfers. For reads, use the PCI addresses stored in a register file within registers 70. For writes, use address/data pairs in the data payload portion of the packet. |
| 100 | Non-Incrementing Simple | Perform standard PCI transfers. All PCI transfers use the same address. |
| 101 | Reserved | Reserved |
| 110 | Non-Incrementing VXI | Perform standard PCI to VXI transfers to the same address. |
| 111 | Simple Local Resources | Access 1394 registers within register 70. The operating system uses this type of transfer during bus enumeration and configuration. | read request packet, and translates the 1394 address into a PCI cycle address, in step 604.

FIG. 9—1394 address to PCI address translation

Referring now to FIG. 9, a diagram illustrating the translation of a 1394 address to a PCI cycle address is shown. As described in Table 1, a 1394 address comprises a 16 bit destination$_{13}$ ID portion and a 48 bit destination offset portion. In Table 1 the destination offset portion is shown as an upper destination offset portion and a lower destination offset portion. As shown in FIG. 9, the destination_ID comprises a 10-bit bus_ID portion and a 6-bit physical_D portion. When the packet receiver 58 receives a 1394 packet, If the non-compelled field is set to one, the translator 40 terminates a write transaction by sending to the host computer 20 an acknowledge packet with an ack$_{13}$ complete value and does not send a response packet. If the non-compelled field is set to one, the translator 40 terminates a read transaction by concatenating the request acknowledge packet and the read response packet. If the non-compelled bit is cleared to zero split-transactions are used.

The transfer size field specifies the size of each PCI cycle generated by the translator 40 as a PCI master in the event that a 1394 request packet is translated into multiple PCI cycles. For example, a request packet with a data_length field of 16 will instruct the translator 40 to generate either four 32-bit word size cycles, eight 16-bit half cycles, or sixteen 8-bit byte cycles determined by the transfer size field having of 11, 10, and 01, respectively. The transfer size field is encoded as shown in Table 6.

TABLE 6

|    | Transfer Sizes    |
|----|-------------------|
| 00 | Largest Available |
| 01 | Bytes             |
| 10 | Half Words        |
| 11 | Words             |

The byte swap bit causes the translator 40 to swap certain bytes in the 1394 packet. The translator 40 swaps bytes that are interpreted as data to be transferred to or from the PCI bus 35. During PCI write transfers, data is swapped before being driven on the PCI bus 35. During PCI read transfers, the PCI data is swapped before being written to the HI read FIFO 72. It is noted that for the Random Write address modes, the 1394 packet includes some "data" that the translator 40 interprets as a PCI address. The translator 40 does not swap these address bytes. If the transfer size is words (32 bits) the translator 40 swaps the data as follows:

```
msb                         lsb
| A | B | C | D | becomes:
| D | C | B | A |
```

If the transfer size is half-words (16 bits) the translator 40 swaps the data as follows:

```
msb   lsb
| A | B |
``` becomes:

```
| B | A |
```

The address mode specific fields are different for VXI and non-VXI transactions. For VXI transfers, there are four specified fields: BSWAP, RMW, Block, and address modifiers. The address modifiers field corresponds to VXI bus address modifier signals. The BSWAP, RMW, and Block fields are written to the registers within the PCI to VXI translator 32 (of FIG. 1*a*) to control PCI bus to VXI bus cycle translation.

For non-VXI transfers, the address space field determines which PCI memory space is accessed. The address space field is encoded as shown in Table 7.

TABLE 7

|    | Address Space       |
|----|---------------------|
| 00 | Memory Space        |
| 01 | IO Space            |
| 10 | Configuration Space |
| 11 | Reserved            |

For non-VXI transfers to PCI Configuration Space, the IDSEL[1:0] field indicates which IDSEL pin, IDSEL[1] or IDSEL[0], should be driven by the translator 40. For accesses to address spaces other than configuration space, the IDSEL bits a programmed to zero by the host computer 20.

For Random Write/Read address modes, the PCI target address is obtained from the data payload portion of the write request packet for random writes and from the registers 70 for random reads. For HI write transactions using the Random Write Addressing Mode, the data payload portion of the request packet contains one or more address/data pairs. Each address/data pair comprises 4 bytes comprising the 32-bit PCI address followed by 1, 2, or 4 bytes of data depending upon the value of the transfer size field as specified above. For example, if the transfer size field specifies half words, the translator 40 would interpret two address/data pairs comprised in three quadlets of the data payload portion of a 1394 write request packet as follows:

| msb | | | lsb |
|---|---|---|---|
| xfer 0; Addr[31::24] | xfer 0; Addr[23::16] | xfer 0; Addr[15::8] | xfer 0; Addr[7::0] |
| xfer 0; Data[15::8] | xfer 0; Data[7::0] | xfer 1; Addr[31::24] | xfer 1; Addr[23::16] |
| xfer 1; Addr[15::8] | xfer 1; Addr[7::0] | xfer 1; Data[15::8] | xfer 1; Data[7::0] |

For HI read transactions using the Random Read Addressing Mode, one or more PCI addresses are specified in a register file comprised within the registers 70. For Simple, Simple Local Resources and Non-Incrementing Simple address modes, the translator 40 interprets the lower 32 bits of the destination offset field as the PCI target address.

For all VXI address modes, the translator 40 interprets the lower 28 bits of the destination offset as the lower 28 bits of the PCI target address. The translator 40 interprets bits [31:28] of the destination offset as a value to be written to a page register within the PCI to VXI translator 32 before performing the transfer.

Referring again to FIG. 8, after translating the 1394 address into a PCI cycle address, the 1394 slave 64 initiates one or more PCI read cycles via the PCI master 66 targeted at the PCI device using the translated PCI cycle address, in step 606. In response to the PCI read cycle initiated by the PCI master 66, the PCI device 30 provides the specified data on the PCI bus 35. The 1394 slave 64 receives from the PCI bus 35 and writes the data to the HI read FIFO 72, in step 608. The packet dispatcher 56 then reads the data from the HI read FIFO 72 and creates a 1394 read response packet including the data in the data payload portion of the 1394 read response packet, in step 610. Preferably, the read response packet also includes a response code value in the response code field indicating the status of the read transaction. The read response packet is then sent to the host computer 20, in step 612. The host computer 20 receives the read response packet and in response transmits a 1394 acknowledge packet to the translator 40 acknowledging the receipt of the read response packet, which the packet receiver 58 receives, in step 614.

Figure 10:
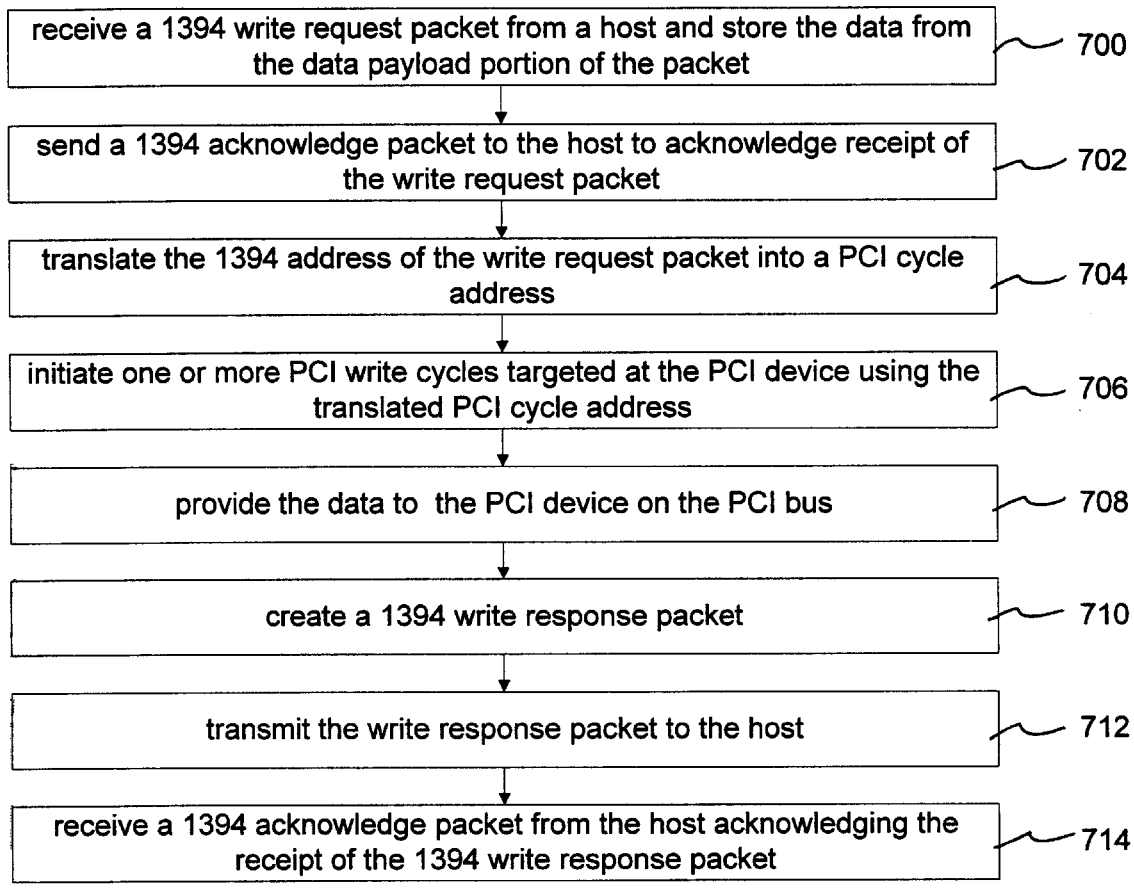
FIG. 10 is a flowchart illustrating steps taken by the translator of FIG. 1 in performing translation of host computer-initiated write operations.

FIG. 10—HI write flowchart

Referring now to FIG. 10, a flowchart is shown illustrating steps taken by the translator 40 of FIG. 1 in performing translation of HI write operations. The host computer 20 transmits a 1394 write request packet to the translator 40 in order to write data to the PCI device 30. The packet receiver 58 receives the write request packet and write the data from the data payload portion of the write request packet to the HI write FIFO 62, in step 700. In response to the write request packet, the packet dispatcher 56 creates and sends a 1394 acknowledge packet to the host computer 20 to acknowledge receipt of the write request packet, in step 702. The 1394 slave 64 receives the header information, in particular the 1394 address portion of the read request packet, and translates the 1394 address into a PCI cycle address, in step 704, as described with reference to FIG. 9.

After translating the 1394 address into a PCI cycle address, the 1394 slave 64 initiates one or more PCI write cycles via the PCI master 66 targeted at the PCI device using the translated PCI cycle address, in step 706. The 1394 slave 64 reads the data from the HI write FIFO 62 and provides the data on the PCI bus 35 via the PCI master 66 to the PCI device 30, in step 708. The packet dispatcher 56 then creates a 1394 write response packet, in step 710. Preferably, the write response packet includes a response code value in the response code field indicating the status of the write transaction. The write response packet is then sent to the host computer 20, in step 712. The host computer 20 receives the write response packet and in response transmits a 1394 acknowledge packet to the translator 40 acknowledging the receipt of the write response packet, which the packet receiver 58 receives, in step 714.

It is noted that if the non-compelled bit is set in the transfer mode portion of the write request packet sent by the host computer 20, then steps 710, 712 and 714 are not performed by the translator 40, i.e., no response packet is sent by the translator 40 to the host computer 20.

Figure 11:
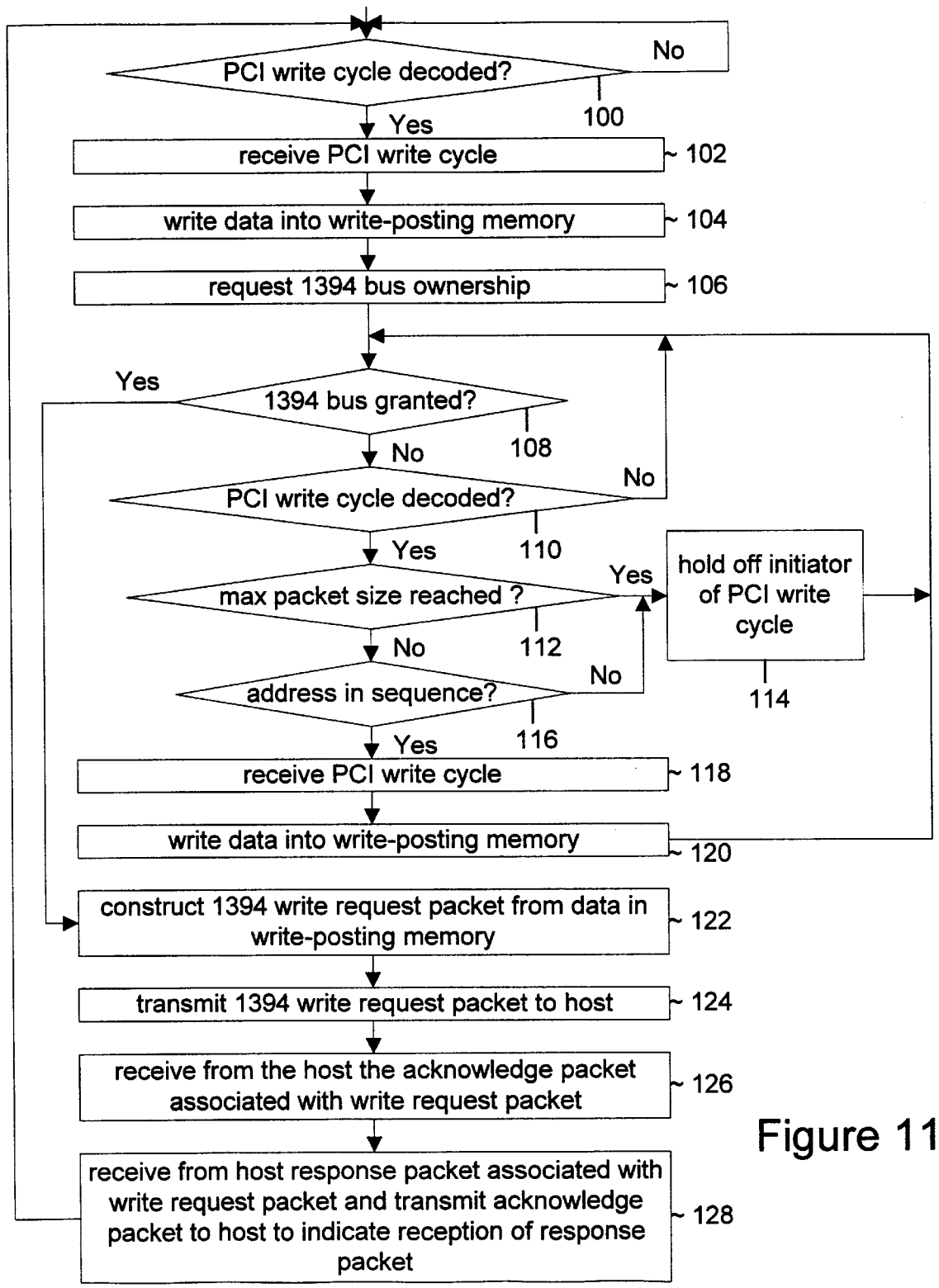
FIG. 11 is a flowchart illustrating steps taken by the PCI bus to IEEE 1394 bus translator of FIG. 1 in performing write posting and combining of sequential PCI write cycles initiated by the PCI device of FIG. 1.

FIG. 11—Sequential Write Posting and Combining

Referring now to FIG. 11, a flowchart is shown illustrating steps taken by the translator 40 of FIG. 1 in performing sequential DI PCI write cycle posting and combining according to the preferred embodiment of the present invention. The PCI slave 50 of the translator 40 monitors the PCI bus 35 waiting for a write cycle to be initiated on the PCI bus, preferably by the PCI device 30. The PCI slave 50 decodes the PCI address generated by the PCI device 30 during the address phase of the PCI write cycle and determines if the address is destined for the translator 40, in step 100. Preferably, PCI addresses in the range 0 through 0x7FFFFFFF are decoded by the translator 40 as destined for the translator 40. The 1394 initiator 52 retains the address of the PCI write cycle and provides the address to the packet dispatcher 56 which uses the address to construct a 1394 write request packet.

The 1394 initiator 52 of the translator 40 receives the PCI write cycle, in step 102, by asserting via the PCI slave 50 the appropriate number of TRDY# signals during the data phase of the PCI write cycle. The 1394 initiator 52 then writes the data received during the PCI write cycle to the DI write-posting memory 54, in step 104. The 1394 initiator 52 provides the data length, i.e., the number of bytes of data written to the DI write-posting memory 54, to the packet dispatcher 56. The packet dispatcher 56 uses the data length to construct a 1394 write request packet to transmit the data. Once the 1394 initiator 52 has written the data received during the PCI write cycle to the DI write-posting memory 54, the 1394 initiator 52 signals the packet dispatcher 56 to request ownership of the 1394 bus 25, in step 106. The translator 40 then waits for the 1394 bus 25 to be granted, in step 108, or for another PCI write cycle destined for the translator 40 to be initiated, in step 110.

While waiting for the 1394 bus 25 to be granted to the translator 40, as determined in step 108, the translator 40 continues to receive PCI write cycles in step 118. The PCI write cycles are received or accepted in step 118 as long as the write cycle addresses are in sequence, as determined in step 116, and the maximum write request packet size has not been reached, as determined in step 112. The translator 40 writes the data from the received PCI write cycles to the DI write-posting memory 54, in step 120, Each time the 1394 initiator 52 writes more data into the DI write-posting memory 54, the 1394 initiator 52 updates the control signals to the packet dispatcher 56 which indicate the length of the data in the DI write-posting memory 54, i.e., the amount of data to be written to the host computer 20 in the 1394 write request packet.

If before the 1394 bus 25 has been granted, a PCI write cycle is decoded and the maximum write request packet size has been reached, as determined in step 112, or the PCI write cycle address is not in sequence, as determined in step 116, then the translator 40 holds off the initiator of the PCI write cycle, i.e., the PCI device 30, in step 114. The translator 40 holds off the PCI device 30 until the previous write transaction is complete. The previous write transaction is complete when the translator 40 receives from the host computer 20 either an acknowledge packet or a response packet associated with the write request packet, depending upon the value of the DCONFLICT bit, as described in FIG. 12 below. Preferably, the translator 40 holds off the PCI device 30 by generating wait state cycles on the PCI bus 35. In an alternate embodiment, the translator 40 holds off the PCI device 30 by initiating a target-initiated retry termination of the PCI write cycle. According to the PCI bus specification, the PCI device 30 may retry the PCI write cycle after detecting the target-initiated retry termination generated by the translator 40.

Once the 1394 bus 25 is granted, the packet dispatcher 56 of the translator 40 constructs a 1394 write request packet, in step 122. The packet dispatcher 56 constructs the write request packet from the data in the DI write-posting memory 54. The packet dispatcher 56 also uses the destination offset signals and data length supplied by the 1394 initiator 52 to construct the header of the write request packet. The packet dispatcher 56 also uses the 1394 host ID value from the registers 70 to construct the write request packet header.

After the packet dispatcher 56 has constructed the 1394 write request packet, the packet dispatcher 56 transmits the write request packet to the host computer 20, in step 124. Preferably, the packet dispatcher 56 provides the write request packet to the interface buffer 74 for transmission to the host computer 20 via the 1394 bus 25.

The host computer 20 receives the write request packet and responds by transmitting a 1394 acknowledge packet, which the translator 40 receives, in step 126. The acknowledge packet may indicate the successful completion of the write transaction, in which case the translator 40 returns to step 100 to receive more DI PCI cycles. Or, the acknowledge packet may indicate that the write transaction is pending. If the write transaction is pending, i.e., if a response packet is forthcoming, the host computer 20 will transmit the response packet and the translator 40 will receive the response packet, in step 128. Once the response packet has been received, the translator 40 transmits an acknowledge packet and returns to step 100 to receive more DI PCI cycles.

Thus, the translator 40 advantageously performs write posting of DI PCI write cycles and combines sequential PCI write cycles into a single 1394 write request packet. The write posting and combining operations increase the overall DI write transaction throughput of the system 10 by reducing the number of request/response packet pairs required to perform a DI write transaction.

Preferably, the translator 40 is configurable to return to step 100 to receive DI PCI write cycles immediately after reception of the acknowledge packet, i.e., before reception of the response packet. Thus, by pipe-lining the construction of subsequent write request packets with consumption by the host computer 20 of the previous write request packet data, the translator 40 improves DI write operation performance. The DI write pipe-lining of the translator 40 will be described with regard to the flowchart of FIG. 12.

Figure 12:
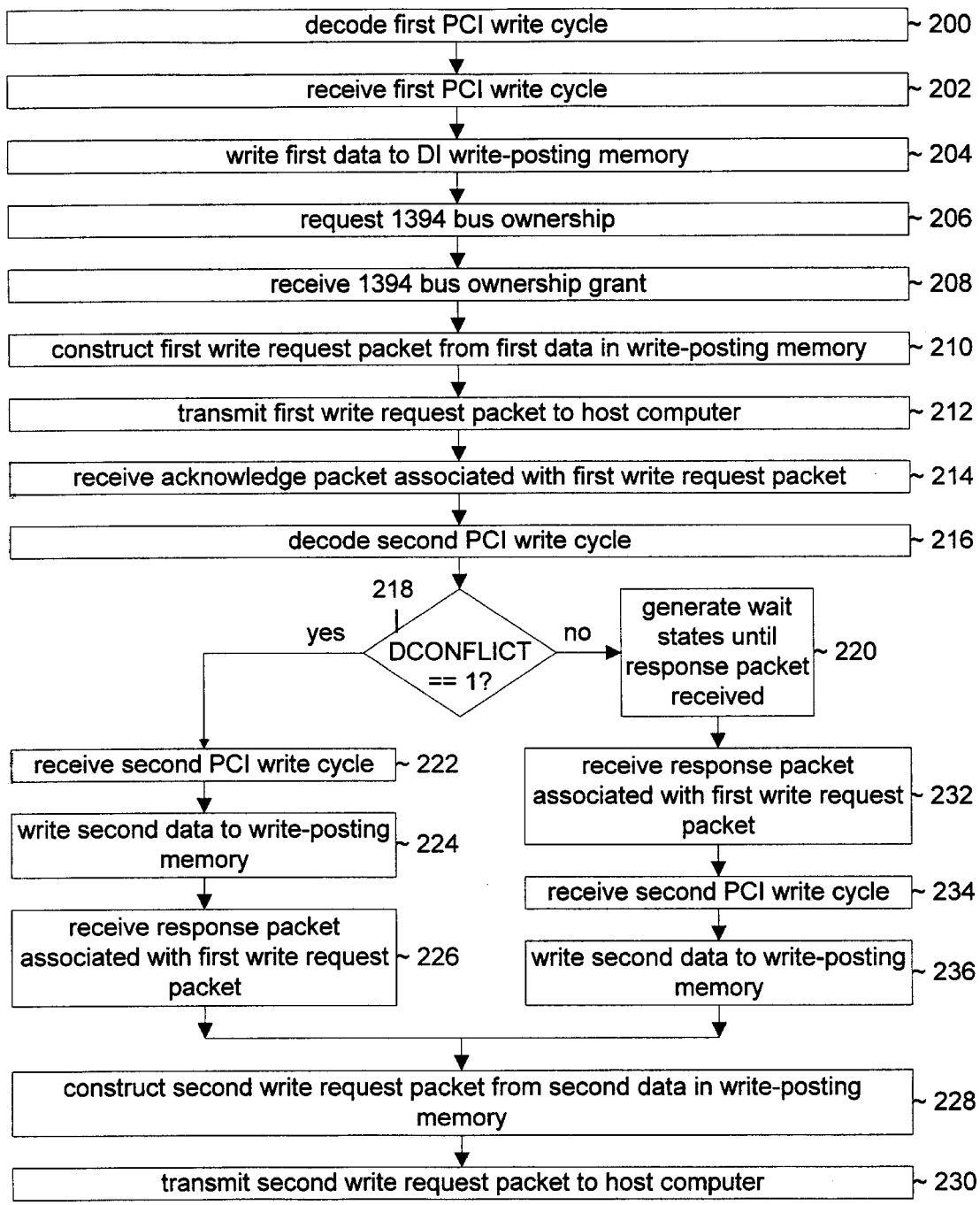
FIG. 12 is a flowchart illustrating steps taken by the PCI bus to IEEE 1394 bus translator of FIG. 1 to perform pipe-lining of write transactions initiated by the PCI device of FIG. 1 according to the preferred embodiment.

FIG. 12—Write Pipelining

Referring now to FIG. 12, a flowchart illustrating steps taken by the translator 40 to perform DI write pipe-lining is shown. The translator 40 decodes a first PCI write cycle initiated by the PCI device 30, in step 200, receives the first DI PCI write cycle, in step 202, and writes the data of the first DI PCI write cycle to the DI write-posting memory 54, in step 204. The translator 40 then requests ownership of the 1394 bus 25, in step 206, and is granted ownership of the 1394 bus 25 in step 208. The translator 40 preferably continues to post sequential DI PCI write cycles until being granted the 1394 bus 25, as described in FIG. 11.

After being granted the 1394 bus 25, the translator 40 constructs a first 1394 write request packet, in step 210, using the data in the DI write-posting memory 54, i.e., the data received in the first PCI write cycle and possible subsequent sequential PCI write cycles. The translator 40 then transmits the first write request packet to the host computer 20, in step 212. The translator 40 later receives from the host computer 20 a 1394 acknowledge packet associated with the first write request packet, in step 214. In this case, the acknowledge packet indicates that the write transaction is pending.

After having received the acknowledge packet from the host computer 20, but prior to having received a response packet from the host computer 20 associated with the first write request packet, the translator 40 decodes new DI PCI write cycle, referred to as a second DI PCI write cycle, in step 216. The translator 40 then determines whether or not it is configured to expect the host computer 20 to return a "resource conflict" return code value in the write response packet. In the preferred embodiment, a bit referred to as the DCONFLICT bit in one of the registers 70 determines whether or not resource conflicts are expected. Preferably, the DCONFLICT bit is writable by the host computer 20.

The translator 40 determines if the DCONFLICT bit is set to a value of 1, i.e., that resource conflicts are not expected from the host computer 20, in step 218. If resource conflicts are not expected, then the translator 40 receives the second DI PCI write cycle, in step 222, and writes the data of the second DI PCI write cycle to the DI write-posting memory 54, in step 224. The translator 40 preferably continues to post DI PCI write cycles which are in sequence with the second PCI write cycle, as described in FIG. 11, until receiving from the host computer 20 a write response packet associated with the first write request packet, in step 226. The write response packet indicates the completion of the first write transaction.

Upon receiving the write response packet, the translator 40 constructs a second 1394 write request packet using the data in the DI write-posting memory 54, i.e., the data received in the second PCI write cycle and the possible subsequent sequential PCI write cycles, in step 228, and transmits the second write request packet to the host computer 20, in step 230. Thus, the translator 40 advantageously pipe-lines construction of the second write request packet with the consumption of the first write request packet by the host computer 20, thereby increasing the DI write transaction throughput. Advantageously, the write pipelining may preferably be performed with a single write-posting memory 54.

If it was determined during step 218 that resource conflicts may be expected, then the translator 40 generates wait states on the PCI bus, in step 220, until the translator 40 receives from the host computer 20 the 1394 write response packet associated with the first 1394 write request packet, in step 232. Once the translator 40 receives the response packet associated with the first 1394 write request packet, the translator 40 receives the second DI PCI write cycle, in step 234, and writes the data of the second DI PCI write cycle to the DI write-posting memory 54, in step 236.

Upon writing the data of the second DI PCI write cycle to the DI write-posting memory 54, the translator 40 constructs a second 1394 write request packet using the data in the DI write-posting memory 54, i.e., the data received in the second PCI write cycle and the possible subsequent sequential PCI write cycles, in step 228, and transmits the second write request packet to the host computer 20, in step 230. Thus, if resource conflicts may be expected from the host computer 20, the translator 40 does not pipe-line construction of the second write request packet with the consumption of the first write request packet by the host computer 20. This allows the translator 40 to resend the first write request packet if the host computer 20 reports a resource conflict.

Figure 12A:
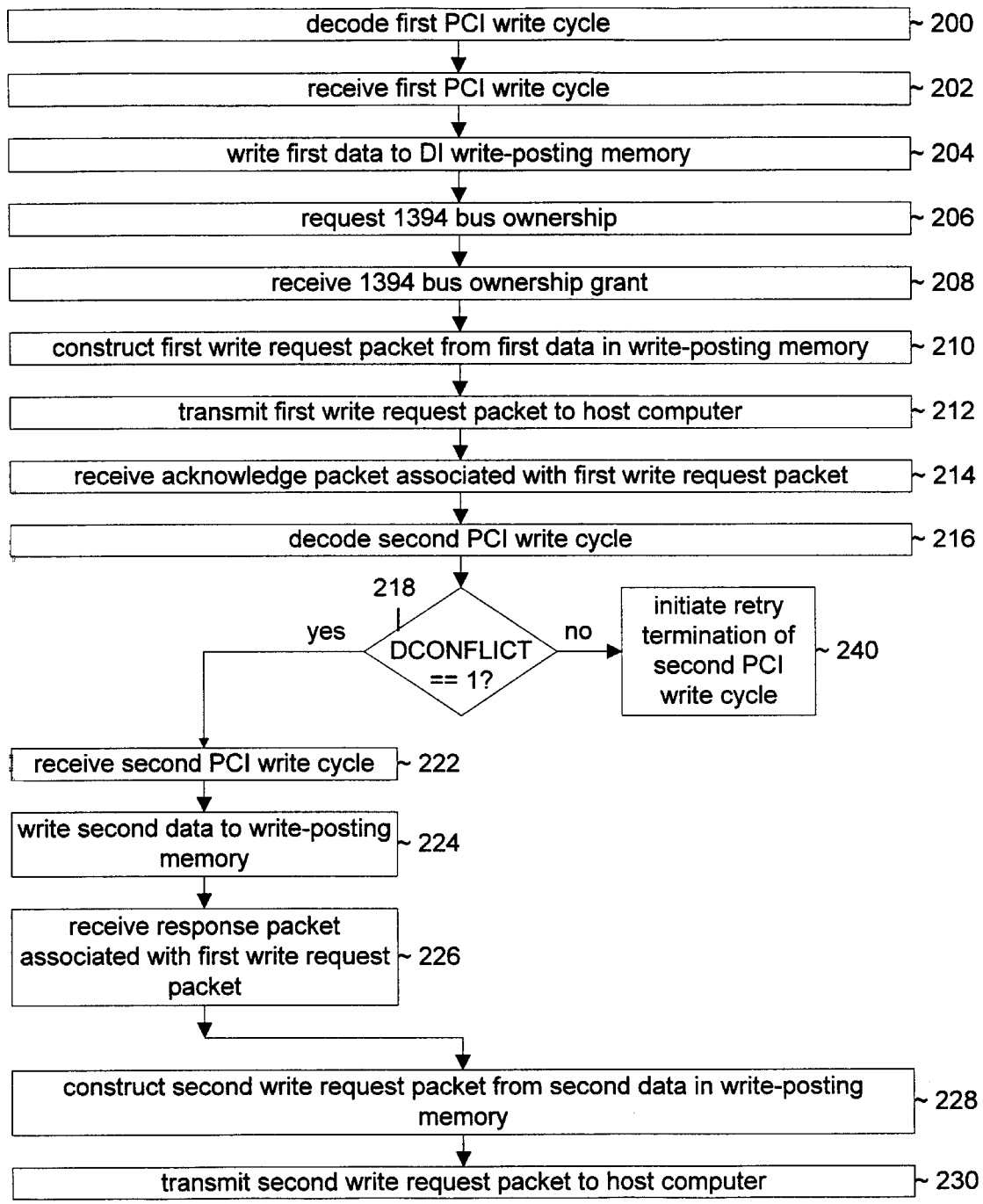
FIG. 12a is a flowchart illustrating steps taken by the PCI bus to IEEE 1394 bus translator of FIG. 1 to perform pipe-lining of write transactions initiated by the PCI device of FIG. 1 according to an alternate embodiment.

Referring now to FIG. 12a, a flowchart illustrating steps taken by the translator 40 to perform DI write pipe-lining according to an alternate embodiment is shown. Most of the steps taken in FIG. 12a are identical to the steps taken in FIG. 12 and like steps are number identically for simplicity and clarity. Steps 200 through 218 of FIG. 12a are identical to those similarly numbered in FIG. 12.

If resource conflicts may be expected, then the translator 40 initiates a target-initiated retry termination of the PCI write cycle, in step 240, rather than generating wait states as in step 220 of FIG. 12. However, if resource conflicts are not expected, then the translator 40 performs steps 222 through 230 as in FIG. 12. According to the PCI bus specification, the PCI device 30 may retry the PCI write cycle after detecting the target-initiated retry termination generated by the translator 40.

Figure 13:
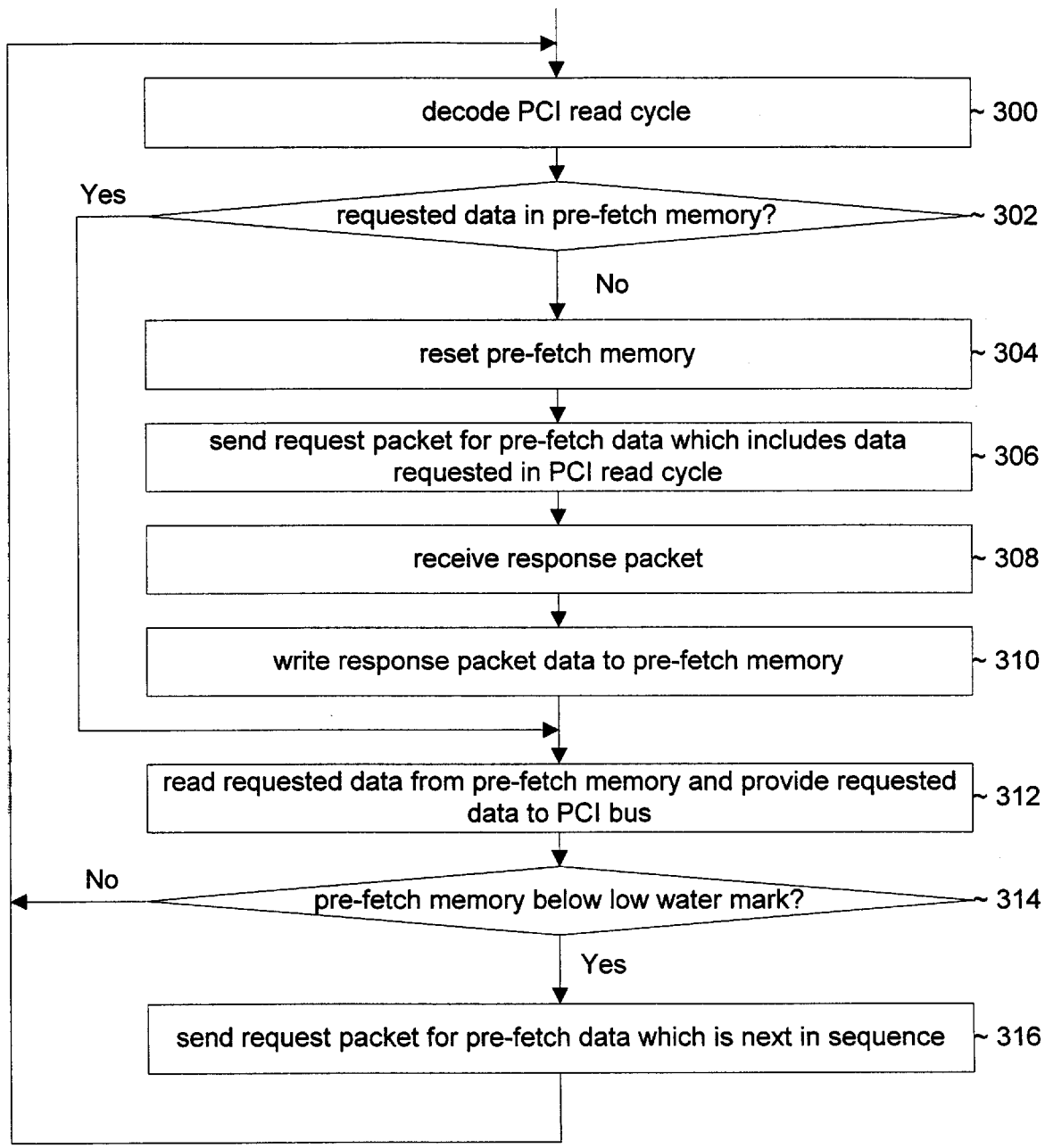
FIG. 13 is a flowchart illustrating steps taken by the PCI bus to IEEE 1394 bus translator of FIG. 1 to perform pipe-lined read pre-fetching of read transactions initiated by the PCI device of FIG. 1.

FIG. 13—Read Prefetching

Referring now to FIG. 13, a flowchart illustrating steps taken by the translator 40 to perform pipe-lined DI read pre-fetching is shown. The PCI device 30 initiates a PCI read cycle on the PCI bus 35 which is destined for the translator 40. The PCI device 30 supplies an address during the address phase of the read cycle. The PCI slave 50 of the translator 40 decodes the PCI read cycle and detects that the read cycle is destined for the translator 40, in step 300. Preferably, PCI addresses in the range 0 through 0x7FFFFFFF are decoded by the translator 40 as destined for the translator 40. The 1394 initiator 52 of the translator 40 uses the PCI read cycle address to determine if the requested data is present in the pre-fetch memory 60, in step 302. The requested data may have been previously pre-fetched into the pre-fetch memory 60 by the translator 40 in response to a previous PCI read cycle, as will be described below in subsequent steps.

In the preferred embodiment, the pre-fetch memory 60 is a FIFO memory for improving the performance of DI PCI read requests which are in sequence. In this embodiment, if the data is not present in the pre-fetch FIFO memory 60, the translator 40 resets the pre-fetch FIFO memory 60, in step 304, to make the FIFO available for incoming data. Resetting the pre-fetch memory 60 comprises performing an operation which discards previously pre-fetched data from the pre-fetch memory 60 in order that the pre-fetch memory 60 may receive forthcoming pre-fetched data. The packet dispatcher 56 of the translator 40 then uses control signals from the 1394 initiator 52 to construct and send a 1394 read request packet to the host computer 20 for data, in step 306.

Preferably, the read request packet destination offset lower address bits, in particular the lower 31 address bits, comprise the lower 31 PCI read cycle address bits. Preferably, the data length specified in the read request packet is the maximum data size for a 1394 packet. In one embodiment, the data size is 64 bytes and in another embodiment the data size is 256 bytes. Preferably, the read data pre-fetch size is configurable via one or more bits in the registers 70. The first data phase of the PCI read cycle is for a maximum of four bytes on a 32-bit wide PCI bus and eight bytes on a 64-bit wide PCI bus. Therefore, the read request packet data includes the data requested in the first data phase of the PCI read cycle as well as additional pre-fetch data which may be used to satisfy subsequent data phases in the PCI read request or subsequent PCI device 35 initiated PCI read cycles. This additional data is prefetched based on the likelihood that the PCI device will subsequently ask for this data.

Preferably, the translator 40 holds off the PCI device 35 until the data becomes available by deasserting the TRDY# signal. In one embodiment, the translator 40 holds off the PCI device 35 by performing a target initiated retry termination.

The host computer 20 receives the 1394 read request packet and sends to the translator 40 a 1394 read response packet including the data specified by the read request packet, i.e., the data for the first data phase of the PCI read cycle and the pre-fetch data. The packet receiver 58 receives the read response packet including the PCI read cycle requested data and pre-fetch data, in step 308, and writes the response packet data to the pre-fetch memory 60, in step 310.

Now that the PCI read cycle requested data is in the pre-fetch memory 60, the 1394 initiator 52 satisfies the first data phase of the PCI read cycle by reading the requested data from the pre-fetch memory 60 and providing the requested data to the PCI bus 35, in step 312. Also, if the 1394 initiator 52 determined in step 302 that the PCI read cycle requested data is present in the pre-fetch memory 60, the translator 40 goes to step 312 to satisfy the first PCI read cycle data phase. Thus, the performance of DI PCI read throughput is potentially increased by pre-fetching data from the host computer 20 into the pre-fetch memory 60 and satisfying DI PCI read cycles from the pre-fetch memory 60.

The translator 40 satisfies subsequent data phases in the PCI read cycle or subsequent PCI device 35 initiated PCI read cycles from the pre-fetch memory 60 as long as the requested data resides in the pre-fetch memory 60. Preferably, the pre-fetch memory 60 is a FIFO memory which may be filled, i.e., written, and emptied, i.e., read. Therefore, at any given point in time the FIFO is a percentage empty. Preferably the pre-fetch FIFO memory 60 includes signals which the 1394 initiator 52 receives for determining when the FIFO becomes a predetermined amount empty. Preferably, each time the translator 40 satisfies a PCI device 35 initiated PCI read cycle data phase from the pre-fetch memory 60, the 1394 initiator 52 determines if the pre-fetch FIFO memory 60 has become the predetermined amount empty, i.e., has reached a predetermined low water mark, in step 314.

If the pre-fetch FIFO memory 60 has reached the low water mark, the translator 40 constructs and sends a 1394 read request packet to the host computer 20 for the data which is next in address sequence with the data previously pre-fetched, in step 316. In response to the next read request packet, the host computer 20 will send a read response packet including the requested data. The translator 40 will receive the read response packet associated with the next read request packet and store the data from the received read response packet into the pre-fetch memory 60. In one embodiment, if the translator 40 receives a read response packet containing pre-fetch data before having consumed the previously pre-fetched data, the translator 40 transmits an acknowledge packet with a retry code to the host computer 20 in response to the read response packet, thereby enabling the translator 40 to clear the pre-fetch memory 60 for reception of the retransmitted read response packet from the host computer 20. Sending the next read request packet before the pre-fetch memory 60 has become empty advantageously pipe-lines the time required to obtain the next data from the host with the consumption of the previous data by the PCI device 30, thereby improving the sequential DI read performance.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A translator for interfacing between an IEEE 1394 bus and a Peripheral Component Interconnect (PCI) bus, wherein said translator is operable to allow a PCI device coupled to the PCI bus to communicate with an IEEE 1394 device coupled to the IEEE 1394 bus, comprising:

a PCI slave coupled to the PCI bus, wherein said PCI slave is operable as a target of a PCI memory cycle initiated by the PCI device, wherein said PCI memory cycle includes an address;

an IEEE 1394 initiator coupled to said PCI slave operable to receive said PCI memory cycle address and translate said PCI memory cycle address into an IEEE 1394 address; and packet dispatcher logic coupled to said IEEE 1394 initiator operable to receive said IEEE 1394 address and create an IEEE 1394 request packet including said IEEE 1394 address for transmission on the IEEE 1394 bus to the IEEE 1394 device;

packet receiver logic operable to receive an IEEE 1394 request packet from the IEEE 1394 device, wherein said request packet includes an IEEE 1394 address;

an IEEE 1394 slave coupled to said packet receiver logic operable to receive said IEEE 1394 address and translate said IEEE 1394 address into a PCI cycle address; and a PCI master coupled to said IEEE 1394 slave operable to receive said PCI cycle address and initiate one or more PCI cycles on the PCI bus to the PCI device.

2. The translator of claim 1, wherein said PCI memory cycle is a PCI memory write cycle, wherein said PCI memory write cycle further includes data, wherein said IEEE 1394 initiator is operable to receive said data and provide said data to said packet dispatcher logic, wherein said request packet is a write request packet, wherein said packet dispatcher logic is operable to include said data in a data payload portion of said write request packet.

3. The translator of claim 1, wherein the packet receiver logic is operable to receive an IEEE 1394 response packet from the IEEE 1394 device, wherein said response packet is sent by the IEEE 1394 device to the translator in response to said request packet.

4. The translator of claim 3, wherein said PCI memory cycle is a PCI memory read cycle, wherein said request packet is a read request packet, wherein said response packet is a read response packet including data associated with said IEEE 1394 address in a data payload portion of said read response packet, wherein said PCI slave is operable to receive said data and provide said data to the PCI device in response to said PCI memory read cycle.

5. The translator of claim 1, wherein said IEEE 1394 address comprises a destination offset portion, wherein said IEEE 1394 initiator translates said PCI memory cycle address into said IEEE 1394 address by assigning a portion of said PCI address to a predetermined lower portion of said destination offset portion.

6. The translator of claim 5, wherein said portion of said PCI address comprises the lower 31 bits of said PCI memory cycle address and said predetermined lower portion of said destination offset portion comprises the lower 31 bits of said destination offset portion.

7. The translator of claim 5, wherein said IEEE 1394 initiator translates said PCI memory cycle address into said IEEE 1394 address by assigning a value from a programmable register comprised in said translator to an predetermined upper portion of said destination offset portion.

8. The translator of claim 1, wherein said IEEE 1394 address comprises a destination identifier portion, wherein said IEEE 1394 initiator translates said PCI memory cycle address into said IEEE 1394 address by assigning a value from a programmable register comprised in said translator to said destination identifier portion.

9. The translator of claim 1, wherein said translator only responds as a target of said PCI memory cycle and creates said request packet if said PCI memory cycle address is within a predetermined subset of the PCI bus address space.

10. The translator of claim 1, further comprising a PCI interrupt request input, wherein said packet dispatcher logic is operable to create a second IEEE 1394 request packet for transmission on the IEEE 1394 bus to the IEEE 1394 device for generation of an interrupt request to the IEEE 1394 device in response to the PCI device generating an interrupt request on said PCI interrupt request input.

11. The translator of claim 10, wherein said IEEE 1394 initiator is operable to provide a predetermined IEEE 1394 address to said packet dispatcher logic in response to the PCI device generating an interrupt request on said interrupt request input, wherein said packet dispatcher logic is operable to receive said predetermined IEEE 1394 address and include said predetermined IEEE 1394 address in said second IEEE 1394 request packet.

12. The translator of claim 11, wherein said predetermined IEEE 1394 address is programmable by the IEEE 1394 device.

13. The translator of claim 1, wherein said PCI device comprises a PCI bus to VXI bus translator coupled to the PCI bus, wherein said PCI device further comprises a VXI instrument coupled to a VXI bus interface of said PCI bus to VXI bus translator.

14. The translator of claim 1, wherein said PCI device comprises a PCI bus to GPIB bus translator coupled to the PCI bus, wherein said PCI device further comprises a GPIB instrument coupled to a GPIB bus interface of said PCI bus to GPIB bus translator.

15. The translator of claim 1, wherein said IEEE 1394 request packet is an IEEE 1394 write request packet, wherein said write request packet further includes data in a data payload portion of said write request packet, wherein said IEEE 1394 slave is operable to receive said data and provide said data to said PCI master, wherein said one or more PCI cycles are PCI write cycles, wherein said PCI master is operable to provide said data to the PCI device on the PCI bus during said PCI write cycles.

16. The translator of claim 1, wherein said packet dispatcher logic is operable to create an IEEE 1394 response packet for transmission on the IEEE 1394 bus to the IEEE 1394 device, wherein said response packet is sent by said translator to the IEEE 1394 device in response to said request packet.

17. The translator of claim 16, wherein said IEEE 1394 request packet is an IEEE 1394 read request packet, wherein said one or more PCI cycles are PCI read cycles, wherein said IEEE 1394 response packet is an IEEE 1394 read response packet including a data payload portion, wherein said PCI master is operable to receive data associated with said PCI read cycle address from the PCI device during said one or more PCI read cycles, wherein said packet dispatcher logic is operable to include said data in said data payload portion of said read response packet.

18. The translator of claim 1, wherein said IEEE 1394 address comprises a PCI address portion within a destination offset portion, wherein said packet receiver logic is operable to provide said PCI address portion to said IEEE 1394 slave, wherein said IEEE 1394 slave is operable to provide said PCI address portion to said PCI master, wherein said PCI cycle address is said PCI address portion.

19. The translator of claim 1, wherein said IEEE 1394 address comprises a destination identifier portion, wherein said translator responds to said request packet if said destination identifier portion identifies said translator as the destination of the request packet.

20. The translator of claim 1, wherein said IEEE 1394 address comprises a portion for specifying if said PCI cycle is a memory, I/O or configuration cycle.

21. The translator of claim 1, wherein said IEEE 1394 address comprises a portion for specifying which IDSEL pin of the PCI bus is to be driven by said translator if said portion specifies a PCI configuration cycle.

22. The translator of claim 1, wherein said IEEE 1394 address comprises a portion for specifying whether or not said translator is to send an IEEE 1394 response packet to the IEEE 1394 device in response to said IEEE 1394 request packet.

23. The translator of claim 1, wherein said IEEE 1394 address comprises a portion for specifying a number of bytes transferred to the PCI device during each of said one or more PCI cycles.

24. The translator of claim 1, wherein said IEEE 1394 address comprises a portion for specifying whether or not to perform byte swapping on data bytes transferred between the PCI device and the IEEE 1394 device.

25. The translator of claim 1, wherein said IEEE 1394 address comprises a portion for specifying that said request packet is directed at registers comprised within said translator rather than at the PCI device.

26. The translator of claim 1, wherein said translator initiates a plurality of PCI cycles targeted at the PCI device in response to said request packet, wherein said IEEE 1394 address comprises a portion for specifying whether each of said plurality of PCI cycles is to the same said PCI cycle address or whether said plurality of PCI cycles are to ascending PCI cycle addresses.

27. The translator of claim 1, wherein said IEEE 1394 address comprises a portion for specifying whether or not to perform a PCI bus to VXI bus transfer in response to said IEEE 1394 request packet.

28. The translator of claim 27, wherein said IEEE 1394 address comprises a portion for specifying VXI bus address modifiers if a PCI bus to VXI bus transfer is specified.

29. The translator of claim 1, wherein said IEEE 1394 request packet is an IEEE 1394 write request packet, wherein said write request packet further includes a data payload portion, wherein said data payload portion includes one or more PCI address/data pairs, wherein said translator initiates a PCI write cycle targeted at the PCI device for each of said one or more PCI address/data pairs, wherein each of said PCI write cycles comprises an address phase specifying an address of a respective one of said one or more PCI address/data pairs and a data phase specifying data of a respective one of said one or more PCI address/data pairs.

30. The translator of claim 1, wherein said IEEE 1394 request packet is an IEEE 1394 read request packet, wherein said translator further comprises a register file for specifying one or more PCI addresses, wherein said translator initiates a PCI read cycle targeted at the PCI device for each of said one or more PCI addresses specified in said register file, wherein each of said PCI read cycles comprises an address phase specifying a respective one of said one or more PCI addresses specified in said register file.

31. The translator of claim 1, wherein the IEEE 1394 device comprises an IEEE 1394 interface in a host computer, wherein the PCI device is a remote PCI device located remotely from the host computer, wherein the PCI device couples to the IEEE 1394 interface in the host computer through an IEEE 1394 bus cable, wherein the translator interfaces between the remote PCI device and the IEEE 1394 bus cable.

32. A translator for interfacing between an IEEE 1394 bus and a Peripheral Component Interconnect (PCI) bus, wherein said translator is operable to allow a PCI device coupled to the PCI bus to communicate with an IEEE 1394 device coupled to the IEEE 1394 bus, comprising:

a PCI slave coupled to the PCI bus, wherein said PCI slave is operable as a target of a PCI memory cycle initiated by the PCI device, wherein said PCI memory cycle includes an address;

an IEEE 1394 initiator coupled to said PCI slave operable to receive said PCI memory cycle address and translate said PCI memory cycle address into an IEEE 1394 address; and packet dispatcher logic coupled to said IEEE 1394 initiator operable to receive said IEEE 1394 address and create an IEEE 1394 request packet including said IEEE 1394 address for transmission on the IEEE 1394 bus to the IEEE 1394 device;

wherein said PCI device comprises a PCI bus to VXI bus translator coupled to the PCI bus, wherein said PCI device further comprises a VXI instrument coupled to a VXI bus interface of said PCI bus to VXI bus translator.

33. A translator for interfacing between an IEEE 1394 bus and a Peripheral Component Interconnect (PCI) bus, wherein said translator is operable to allow a PCI device coupled to the PCI bus to communicate with an IEEE 1394 device coupled to the IEEE 1394 bus, comprising:

a PCI slave coupled to the PCI bus, wherein said PCI slave is operable as a target of a PCI memory cycle initiated by the PCI device, wherein said PCI memory cycle includes an address;

an IEEE 1394 initiator coupled to said PCI slave operable to receive said PCI memory cycle address and translate said PCI memory cycle address into an IEEE 1394 address; and packet dispatcher logic coupled to said IEEE 1394 initiator operable to receive said IEEE 1394 address and create an IEEE 1394 request packet including said IEEE 1394 address for transmission on the IEEE 1394 bus to the IEEE 1394 device;

wherein said PCI device comprises a PCI bus to GPIB bus translator coupled to the PCI bus, wherein said PCI device further comprises a GPIB instrument coupled to a GPIB bus interface of said PCI bus to GPIB bus translator.

34. A system comprising:

an IEEE 1394 device;

an IEEE 1394 bus coupled to said IEEE 1394 device;

a Peripheral Component Interconnect (PCI) device;

a PCI bus coupled to said PCI device; and a translator for interfacing between said IEEE 1394 bus and said PCI bus, wherein said translator is operable to allow said PCI device coupled to said PCI bus to communicate with said IEEE 1394 device coupled to said IEEE 1394 bus, comprising:

a PCI slave coupled to the PCI bus, wherein said PCI slave is operable as a target of a PCI memory cycle initiated by the PCI device, wherein said PCI memory cycle includes an address;

an IEEE 1394 initiator coupled to said PCI slave operable to receive said PCI memory cycle address and translate said PCI memory cycle address into an IEEE 1394 address; and packet dispatcher logic coupled to said IEEE 1394 initiator operable to receive said IEEE 1394 address and create an IEEE 1394 request packet including said IEEE 1394 address for transmission on the IEEE 1394 bus to the IEEE 1394 device;

packet receiver logic operable to receive an IEEE 1394 request packet from the IEEE 1394 device, wherein said request packet includes an IEEE 1394 address;

an IEEE 1394 slave coupled to said packet receiver logic operable to receive said IEEE 1394 address and translate said IEEE 1394 address into a PCI cycle address; and a PCI master coupled to said IEEE 1394 slave operable to receive said PCI cycle address and initiate a PCI cycle on the PCI bus to the PCI device.

35. The system of claim 34, wherein said packet receiver logic is operable to receive an IEEE 1394 response packet from the IEEE 1394 device, wherein said response packet is sent by the IEEE 1394 device to the translator in response to said request packet.

36. The system of claim 34, wherein said IEEE 1394 address comprises a destination offset portion, wherein said IEEE 1394 initiator translates said PCI memory cycle address into said IEEE 1394 address by assigning a portion of said PCI address to a predetermined lower portion of said destination offset portion.

37. The system of claim 34, further comprising a PCI bus to VXI bus translator including a PCI bus interface coupled to the PCI bus, and a VXI instrument coupled to a VXI bus interface of said PCI bus to VXI bus translator.

38. The system of claim 34, wherein said PCI device comprises a PCI bus to GPIB bus translator including a PCI bus interface coupled to the PCI bus, wherein said PCI device further comprises a GPIB instrument coupled to a GPIB bus interface of said PCI bus to GPIB bus translator.

39. The system of claim 34, wherein said packet dispatcher logic is operable to create an IEEE 1394 response packet for transmission on the IEEE 1394 bus to the IEEE 1394 device, wherein said response packet is sent by said translator to the IEEE 1394 device in response to said request packet.

40. The system of claim 34, wherein said IEEE 1394 address comprises a PCI address portion within a destination offset portion, wherein said packet receiver logic is operable to provide said PCI address portion to said IEEE 1394 slave, wherein said IEEE 1394 slave is operable to provide said PCI address portion to said PCI master, wherein said PCI cycle address is said PCI address portion.

41. A system comprising:
an IEEE 1394 device;
an IEEE 1394 bus coupled to said IEEE 1394 device;
a Peripheral Component Interconnect (PCI) bus;
a PCI device coupled to said PCI bus, wherein said PCI device comprises a PCI bus to VXI bus translator including a PCI bus interface coupled to the PCI bus, wherein said PCI device further comprises a VXI instrument coupled to a VXI bus interface of said PCI bus to VXI bus translator; and
translator for interfacing between said IEEE 1394 bus and said PCI bus, wherein said translator is operable to allow said PCI device coupled to said PCI bus to communicate with said IEEE 1394 device coupled to said IEEE 1394 bus, comprising:
a PCI slave coupled to the PCI bus, wherein said PCI slave is operable as a target of a PCI memory cycle initiated by the PCI device, wherein said PCI memory cycle includes an address;
an IEEE 1394 initiator coupled to said PCI slave operable to receive said PCI memory cycle address and translate said PCI memory cycle address into an IEEE 1394 address; and
packet dispatcher logic coupled to said IEEE 1394 initiator operable to receive said IEEE 1394 address and create an IEEE 1394 request packet including said IEEE 1394 address for transmission on the IEEE 1394 bus to the IEEE 1394 device.

42. A system comprising:
an IEEE 1394 device;
an IEEE 1394 bus coupled to said IEEE 1394 device;
a Peripheral Component Interconnect (PCI) bus;
a PCI device coupled to said PCI bus, wherein said PCI device comprises a PCI bus to GPIB bus translator including a PCI bus interface coupled to the PCI bus, wherein said PCI device further comprises a GPIB instrument coupled to a GPIB bus interface of said PCI bus to GPIB bus translator; and
translator for interfacing between said IEEE 1394 bus and said PCI bus, wherein said translator is operable to allow said PCI device coupled to said PCI bus to communicate with said IEEE 1394 device coupled to said IEEE 1394 bus, comprising:
a PCI slave coupled to the PCI bus, wherein said PCI slave is operable as a target of a PCI memory cycle initiated by the PCI device, wherein said PCI memory cycle includes an address;
an IEEE 1394 initiator coupled to said PCI slave operable to receive said PCI memory cycle address and translate said PCI memory cycle address into an IEEE 1394 address; and
packet dispatcher logic coupled to said IEEE 1394 initiator operable to receive said IEEE 1394 address and create an IEEE 1394 request packet including said IEEE 1394 address for transmission on the IEEE 1394 bus to the IEEE 1394 device.

43. A method for translating memory cycles initiated on a PCI bus by a PCI device into one or more transactions with an IEEE 1394 device coupled to an IEEE 1394 bus, wherein the PCI bus memory cycles include a PCI memory cycle address, the method comprising:
receiving a PCI bus memory cycle initiated by the PCI device;
translating said PCI memory cycle address into an IEEE 1394 address; and
creating an IEEE 1394 request packet including said IEEE 1394 address for transmission on the IEEE 1394 bus to the IEEE 1394 device;
receiving an IEEE 1394 request packet from the IEEE 1394 device, wherein said request packet includes an IEEE 1394 address;
translating said IEEE 1394 address into a PCI cycle address; and
initiating a PCI cycle on the PCI bus to the PCI device, wherein said PCI cycle includes said translated PCI cycle address.

44. The method of claim 43, further comprising receiving an IEEE 1394 response packet from the IEEE 1394 device, wherein said response packet is sent by the IEEE 1394 device to the translator in response to said request packet.

45. The method of claim 43, wherein said IEEE 1394 address comprises a destination offset portion, wherein said translating said PCI memory cycle address into said IEEE 1394 address comprises assigning a portion of said PCI address to a predetermined lower portion of said destination offset portion.

46. The method of claim 43, further comprising creating an IEEE 1394 response packet for transmission on the IEEE 1394 bus to the IEEE 1394 device, wherein said response packet is sent to the IEEE 1394 device in response to said request packet.

47. The method of claim 43, wherein said IEEE 1394 address comprises a PCI address portion within a destination offset portion, wherein said PCI cycle address is said PCI address portion.

48. A system comprising:

a host computer system including an IEEE 1394 bus interface;

an IEEE 1394 bus cable coupled to said IEEE 1394 interface, wherein the IEEE 1394 bus cable implements an IEEE 1394 bus; and a remote Peripheral Component Interconnect (PCI) device coupled to the IEEE 1394 bus cable, wherein the remote PCI device includes:

a PCI bus interface; and a translator coupled to said PCI bus interface and coupled to said IEEE 1394 bus cable for interfacing between said IEEE 1394 bus interface and said PCI bus interface, wherein said translator is operable to allow said remote PCI device to communicate with said IEEE 1394 bus, the translator comprising:

a PCI slave coupled to the PCI bus interface, wherein said PCI slave is operable as a target of a PCI memory cycle initiated by the PCI device, wherein said PCI memory cycle includes an address;

an IEEE 1394 initiator coupled to said PCI slave operable to receive said PCI memory cycle address and translate said PCI memory cycle address into an IEEE 1394 address; and packet dispatcher logic coupled to said IEEE 1394 initiator operable to receive said IEEE 1394 address and create an IEEE 1394 request packet including said IEEE 1394 address for transmission on the IEEE 1394 bus to the IEEE 1394 interface.

49. The system of claim 48, further comprising packet receiver logic operable to receive an IEEE 1394 response packet from the IEEE 1394 interface, wherein said response packet is sent by the IEEE 1394 device to the translator in response to said request packet.

50. The system of claim 48, wherein said IEEE 1394 address comprises a destination offset portion, wherein said IEEE 1394 initiator translates said PCI memory cycle address into said IEEE 1394 address by assigning a portion of said PCI address to a predetermined lower portion of said destination offset portion.

51. The system of claim 48, wherein said PCI device comprises a PCI bus to VXI bus translator including a PCI bus interface coupled to the PCI bus, and a VXI instrument coupled to a VXI bus interface of said PCI bus to VXI bus translator.

52. The system of claim 48, wherein said PCI device comprises a PCI bus to GPIB bus translator including a PCI bus interface coupled to the PCI bus, wherein said PCI device further comprises a GPIB instrument coupled to a GPIB bus interface of said PCI bus to GPIB bus translator.

53. The system of claim 48, wherein said translator further comprises:

packet receiver logic operable to receive an IEEE 1394 request packet from the IEEE 1394 interface, wherein said request packet includes an IEEE 1394 address;

an IEEE 1394 slave coupled to said packet receiver logic operable to receive said IEEE 1394 address and translate said IEEE 1394 address into a PCI cycle address; and a PCI master coupled to said IEEE 1394 slave operable to receive said PCI cycle address and initiate a PCI cycle on the PCI bus to the PCI device.

54. The system of claim 53, further comprising packet dispatcher logic operable to create an IEEE 1394 response packet for transmission on the IEEE 1394 bus to the IEEE 1394 interface, wherein said response packet is sent by said translator to the IEEE 1394 interface in response to said request packet.

55. The system of claim 53, wherein said IEEE 1394 address comprises a PCI address portion within a destination offset portion, wherein said packet receiver logic is operable to provide said PCI address portion to said IEEE 1394 slave, wherein said IEEE 1394 slave is operable to provide said PCI address portion to said PCI master, wherein said PCI cycle address is said PCI address portion.

56. A system comprising:

a host computer system including a memory-mapped serial bus interface;

a serial bus cable coupled to said serial bus interface, wherein the serial bus cable implements a memory-mapped serial bus; and a remote input/output (I/O) device coupled to the serial bus cable, wherein the remote I/O device includes:

an expansion bus interface; and a translator coupled to expansion bus interface and coupled to said serial cable for interfacing between said serial bus interface and said expansion bus interface, wherein said translator is operable to allow said remote I/O device to communicate with said serial bus, the translator comprising:

an expansion bus slave coupled to the expansion bus interface, wherein said expansion bus slave is operable as a target of an expansion bus memory cycle initiated by the I/O device, wherein said expansion bus memory cycle includes an address;

a serial bus initiator coupled to said expansion bus slave operable to receive said expansion bus memory cycle address and translate said expansion bus memory cycle address into a serial bus address; and packet dispatcher logic coupled to said serial bus initiator operable to receive said serial bus address and create a serial bus request packet including said serial bus address for transmission on the serial bus to the serial bus interface.

* * * * *